US009158993B2

(12) United States Patent
Lee

(10) Patent No.: US 9,158,993 B2
(45) Date of Patent: *Oct. 13, 2015

(54) VIDEO COMPARISON USING COLOR HISTOGRAMS

(71) Applicant: The Nielsen Company (US), LLC, Schaumburg, IL (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,828

(22) Filed: Nov. 24, 2014

(65) Prior Publication Data

US 2015/0078659 A1    Mar. 19, 2015

Related U.S. Application Data

(63) Continuation of application No. 13/324,692, filed on Dec. 13, 2011, now Pat. No. 8,897,554.

(51) Int. Cl.
  *G06K 9/46*      (2006.01)
  *G06K 9/00*      (2006.01)
  *G06F 17/30*     (2006.01)

(52) U.S. Cl.
  CPC ........ *G06K 9/4642* (2013.01); *G06F 17/30802* (2013.01); *G06K 9/00758* (2013.01); *G06K 9/4652* (2013.01)

(58) Field of Classification Search
  USPC ............ 382/164, 165, 170, 305; 345/88, 690; 348/700, 722; 725/19; 709/224
  See application file for complete search history.

(56) References Cited

U.S. PATENT DOCUMENTS 4,996,594 A     2/1991  Murayama
5,426,684 A     6/1995  Gaborski et al.
(Continued)

FOREIGN PATENT DOCUMENTS

EP    1873715    1/2008
EP    1873717    1/2008
(Continued)

OTHER PUBLICATIONS

Nikolaidis et al., "Image and Video Fingerprinting for Digital Rights Management of Multimedia Data," 2006 International Symposium on Intelligent Signal Processing and Communication Systems (ISPACS2006), Tottori, Japan (7 pages).

(Continued)

Primary Examiner — Duy M Dang
(74) Attorney, Agent, or Firm — Hanley, Flight & Zimmerman, LLC

(57) ABSTRACT

Methods, apparatus and articles of manufacture for video comparison using color histograms are disclosed. Example methods disclosed herein to compare video sequences include determining a color histogram corresponding to an input video sequence based on color values of pixels sampled from a plurality of video frames of the input video sequence. Such example methods also include adjusting the color histogram corresponding to the input video sequence based on a first reference color histogram corresponding to a first reference video sequence to determine a first adjusted color histogram corresponding to the input video sequence. Such example methods further include comparing the adjusted color histogram and the first reference color histogram to determine whether the first reference video sequence matches the input video sequence.

17 Claims, 11 Drawing Sheets

(56) References Cited

U.S. PATENT DOCUMENTS

| | | | |
|---|---|---|---|
| 5,546,475 A | 8/1996 | Bolle et al. | |
| 5,594,807 A | 1/1997 | Liu | |
| 5,708,767 A | 1/1998 | Yeo et al. | |
| 5,767,893 A | 6/1998 | Chen et al. | |
| 5,805,733 A | 9/1998 | Wang et al. | |
| 5,821,945 A | 10/1998 | Yeo et al. | |
| 5,956,026 A | 9/1999 | Ratakonda | |
| 5,990,980 A | 11/1999 | Golin | |
| 6,157,744 A | 12/2000 | Nagasaka et al. | |
| 6,185,314 B1 | 2/2001 | Crabtree et al. | |
| 6,243,713 B1 | 6/2001 | Nelson et al. | |
| 6,263,088 B1 | 7/2001 | Crabtree et al. | |
| 6,278,989 B1 | 8/2001 | Chaudhuri et al. | |
| 6,366,680 B1 | 4/2002 | Brunk et al. | |
| 6,430,312 B1 | 8/2002 | Huang et al. | |
| 6,556,710 B2 | 4/2003 | Pass et al. | |
| 6,611,622 B1 | 8/2003 | Krumm | |
| 6,675,174 B1 | 1/2004 | Bolle et al. | |
| 6,708,167 B2 | 3/2004 | Lee et al. | |
| 6,721,447 B1 | 4/2004 | Kim et al. | |
| 6,724,915 B1 | 4/2004 | Toklu et al. | |
| 6,741,655 B1 | 5/2004 | Chang et al. | |
| 6,782,125 B2 | 8/2004 | Lee et al. | |
| 6,782,127 B1 | 8/2004 | Lee et al. | |
| 6,810,145 B2 | 10/2004 | Briand et al. | |
| 6,940,545 B1 | 9/2005 | Ray et al. | |
| 6,941,321 B2 | 9/2005 | Schuetze et al. | |
| 6,944,332 B1 | 9/2005 | Brechner | |
| 7,003,518 B2 | 2/2006 | Lee et al. | |
| 7,051,271 B1 | 5/2006 | Chiu et al. | |
| 7,103,222 B2 | 9/2006 | Peker | |
| 7,170,566 B2 | 1/2007 | McGee et al. | |
| 7,203,366 B2 | 4/2007 | Miyatake et al. | |
| 7,283,668 B2 | 10/2007 | Moon et al. | |
| 7,340,096 B2 | 3/2008 | Stauder et al. | |
| 7,376,271 B2 | 5/2008 | Lee et al. | |
| 7,411,698 B2 | 8/2008 | Gallina | |
| 7,756,299 B2 | 7/2010 | Higaki | |
| 8,004,576 B2 | 8/2011 | Sharma | |
| 8,897,553 B2 * | 11/2014 | Lee | 382/165 |
| 8,897,554 B2 * | 11/2014 | Lee | 382/165 |
| 2002/0021836 A1 | 2/2002 | Lee et al. | |
| 2004/0133927 A1 | 7/2004 | Sternberg et al. | |
| 2004/0218837 A1 | 11/2004 | Shiyama | |
| 2005/0093795 A1 * | 5/2005 | Lin et al. | 345/88 |
| 2005/0172312 A1 | 8/2005 | Lienhart et al. | |
| 2006/0187358 A1 | 8/2006 | Lienhart et al. | |
| 2006/0195860 A1 | 8/2006 | Eldering et al. | |
| 2006/0242667 A1 | 10/2006 | Petersen et al. | |
| 2006/0248569 A1 | 11/2006 | Lienhart et al. | |
| 2008/0059899 A1 | 3/2008 | Gemmell et al. | |
| 2008/0068622 A1 | 3/2008 | Deng et al. | |
| 2008/0226173 A1 | 9/2008 | Yuan et al. | |
| 2009/0125510 A1 | 5/2009 | Graham et al. | |
| 2009/0198599 A1 | 8/2009 | Hui et al. | |
| 2010/0177234 A1 | 7/2010 | Ogura et al. | |
| 2010/0226574 A1 | 9/2010 | Omori | |
| 2010/0316290 A1 | 12/2010 | Jia | |
| 2011/0221920 A1 | 9/2011 | Gwak | |
| 2011/0268320 A1 | 11/2011 | Huang et al. | |
| 2013/0148882 A1 | 6/2013 | Lee | |
| 2013/0148883 A1 | 6/2013 | Lee | |
| 2013/0148884 A1 | 6/2013 | Lee | |
| 2014/0233852 A1 | 8/2014 | Lee | |
| 2015/0078658 A1 | 3/2015 | Lee | |

FOREIGN PATENT DOCUMENTS

| | | |
|---|---|---|
| GB | 2349031 | 10/2000 |
| WO | 9967695 | 12/1999 |

OTHER PUBLICATIONS

United States Patent and Trademark Office, "Non-Final Office Action", issued in connection with U.S. Appl. No. 13/324,624, dated Feb. 27, 2014 (6 pages).

United States Patent and Trademark Office, "Non-Final Office Action", issued in connection with U.S. Appl. No. 13/324,695, dated Aug. 20, 2013 (12 pages).

United States Patent and Trademark Office, "Notice of Allowance", issued in connection with U.S. Appl. No. 13/324,695, dated Jan. 10, 2014 (5 pages).

United States Patent and Trademark Office, "Non-Final Office Action", issued in connection with U.S. Appl. No. 14/263,501 dated Jun. 26, 2014 (5 pages).

United States Patent and Trademark Office, "Notice of Allowance", issued in connection with U.S. Appl. No. 13/324,624, dated Jul. 8, 2014 (9 pages).

United States Patent and Trademark Office, "Notice of Allowance", issued in connection with U.S. Appl. No. 14/263,501, dated Oct. 8, 2014 (5 pages).

United States Patent and Trademark Office, "Non-Final Office Action", issued in connection with U.S. Appl. No. 13/324,692, dated Mar. 13, 2014 (6 pages).

United States Patent and Trademark Office, "Notice of Allowance", issued in connection with U.S. Appl. No. 13/324,692, dated Jul. 21, 2014 (8 pages).

United States Patent and Trademark Office, "Corrected Notice of Allowance", issued in connection with U.S. Appl. No. 13/324,692, dated Oct. 8, 2014 (2 pages).

United States Patent and Trademark Office, "Corrected Notice of Allowance", issued in connection with U.S. Appl. No. 13/324,692, dated Oct. 16, 2014 (2 pages).

United States Patent and Trademark Office, "Corrected Notice of Allowance", issued in connection with U.S. Appl. No. 13/324,692, dated Oct. 28, 2014 (2 pages).

\* cited by examiner

US 9,158,993 B2

VIDEO COMPARISON USING COLOR HISTOGRAMS

This patent arises from a continuation of U.S. patent application Ser. No. 13/324,692 (now U.S. Pat. No. 8,897,554), which is entitled "VIDEO COMPARISON USING COLOR HISTOGRAMS" and which was filed on Dec. 13, 2011. U.S. patent application Ser. No. 13/324,692 is hereby incorporated by reference in its entirety.

FIELD OF THE DISCLOSURE

This disclosure relates generally to comparing videos and, more particularly, to video comparison using color histograms.

BACKGROUND

Image processing techniques for comparing videos can have many practical applications. For example, video comparison techniques that compare an input, or test, video to one or more reference videos can be applied to the detection and identification of broadcast, on-demand and/or online media content selected for viewing by viewers, the detection and verification of advertisements presented with or otherwise accompanying broadcast, on-demand and/or online media content, the detection and verification of product placements in television programming, etc. Prior video comparison techniques include techniques that compare different videos using video and/or image signatures and techniques that perform pixel-by-pixel comparison of video frames from the different videos.

DETAILED DESCRIPTION

Figure 1:
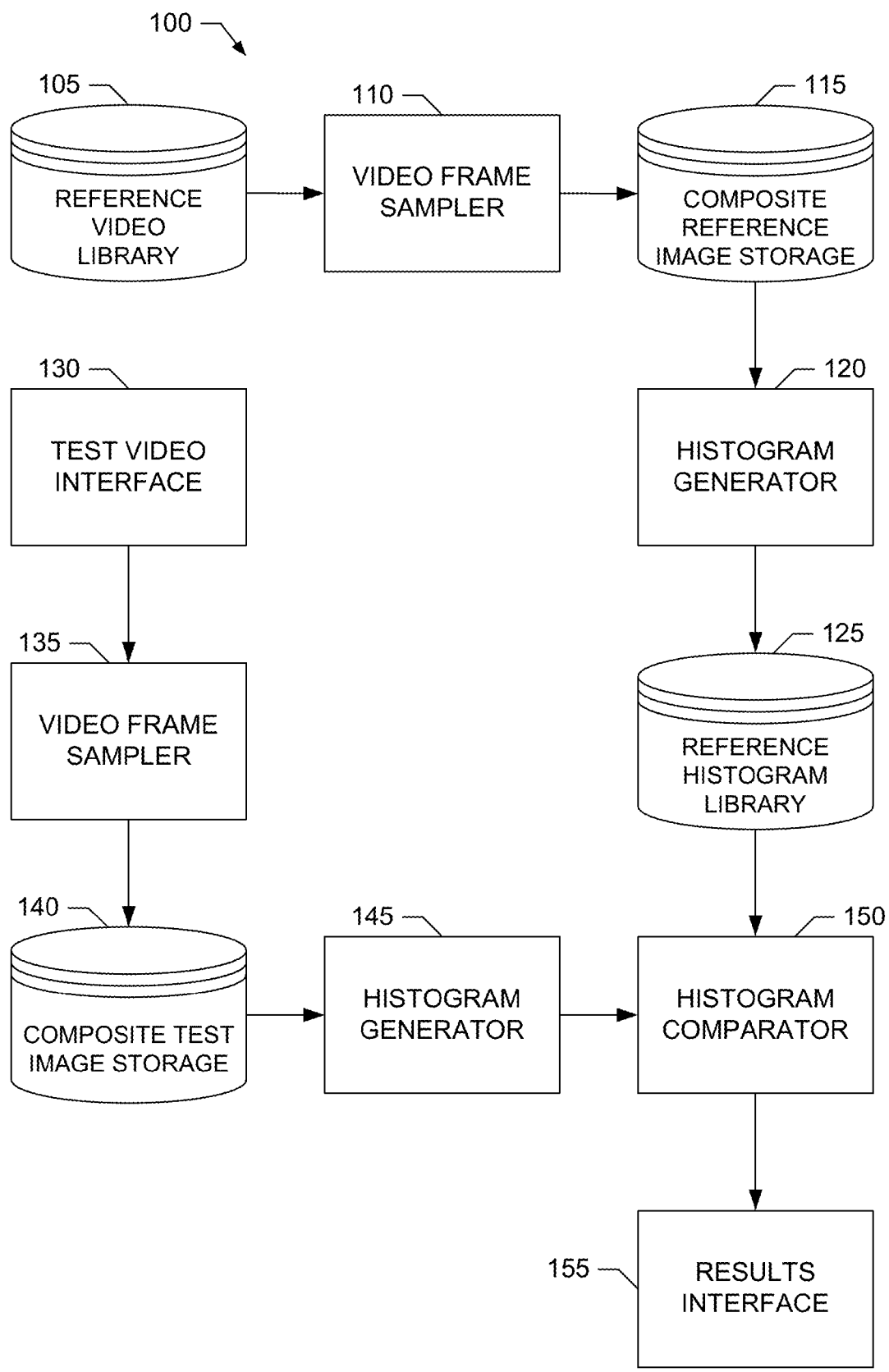
FIG. 1 is a block diagram of an example video comparison system for comparing videos using color histograms as disclosed herein.

Methods, apparatus and articles of manufacture for video comparison using color histograms are disclosed herein. In general, a color histogram for a video (e.g., corresponding to a video frame or a sequence of video frames from a video) includes a set of bins (also referred to herein as color bins) representing a respective set of possible colors that may be included in the video frame(s). For example, a particular bin corresponding to a particular color (or, in other words, a particular color bin) can have a bin value representing a count of the number of pixels of the video frame(s) (or a sampled version/subset of the video frame(s)) having that particular color. In some examples, the color histogram for a video can be stored in a data format that may be used as a signature (e.g., a unique or substantially unique proxy) representative of the video. In such examples, the color histogram for a video may be referred to as the video's color histogram signature.

An example method disclosed herein to compare a first video and a second video using color histograms includes obtaining a first color histogram corresponding to a sequence of frames of the first video (e.g., a reference video), and obtaining a second color histogram corresponding to a sequence of frames of the second video (e.g., a test video, also referred to herein as an input video). The disclosed example method also includes determining a first comparison metric based on differences between bin values of the first color histogram and adjusted bin values of the second color histogram. The disclosed example method further includes determining whether the first video and the second video match based on the first comparison metric.

As described in detail below, in some examples, the method obtains a color histogram corresponding to a sequence of frames of a video by sampling the sequence of video frames from the video and further sampling a set of all or at least some of the pixels from each one of the sequence of video frames (e.g., using uniform or random sampling of pixels in each of the video frames). The example method then quantizes color values of the set of pixels from the sequence of video frames and includes the set of pixels in color bins of the color histogram based on the quantized color values of the set of pixels.

In some examples, the disclosed example method determines the adjusted bin values of the second color histogram (for use in determining the first comparison metric) by scaling bin values of the second color histogram by a scale factor (e.g., such as a scale factor of 2 or another value) to determine scaled bin values of the second color histogram. The example method then determines an adjusted bin value of the second color histogram for a particular color bin to be a smaller (e.g., minimum) of a scaled bin value of the second color histogram for the particular color bin or a respective bin value of the first color histogram for the particular color bin. In some examples, the method determines the first comparison metric by determining the differences between the bin values of the first color histogram and the respective adjusted bin values of the second color histogram, and summing the differences to determine the first comparison metric.

In some examples, the disclosed example method determines that the first video and the second video match, or substantially match, when the first comparison metric is less than or equal to a threshold. In some examples, the method further includes determining a second comparison metric based on differences between bin values of the second color histogram and adjusted bin values of the first color histogram. In such examples, the method determines whether the first video and the second video match based on the first comparison metric and the second comparison metric. For example, the method can determine that the first video and the second video match when at least one of the first comparison metric or the second comparison metric is less than or equal to the threshold. The example method can also determine that the first video and the second video match do not match when the first comparison metric and the second comparison metric are each greater than the threshold.

As noted above, image processing techniques for comparing videos can have many practical applications. However, at least some prior video comparison techniques are limited in that they are able to indicate that two videos match only when the videos are identical or nearly identical. However, in at least some circumstances, it may be beneficial to identify video content as belonging to a group of similar, but not identical, content. Groups of similar video content include, for example: (1) groups of commercial advertisements having the same video but different audio tracks; (2) groups of commercial advertisements having minor producer modifications, such as one scene being replaced with a different scene in an otherwise similar advertisement; (3) groups of commercial advertisements in which different text is overlaid on a the same video content; (4) groups of video clips corresponding to the same content but with different network logos overlaid on different video clips; (5) groups of video clips corresponding to the same content but truncated to different lengths; (6) groups of video clips corresponding to the same content but having different image/frame sizes; etc. Unlike such prior video comparison techniques, video comparison using color histograms as disclosed herein can identify videos that are identical (or nearly) identical, and can also identify videos that have similar, but not necessarily identical, content.

Turning to the figures, a block diagram of an example video comparison system 100 that may be used to compare videos using color histograms in accordance with the example methods, apparatus and articles of manufacture disclosed herein is illustrated in FIG. 1. The video comparison system 100 includes an example reference video library 105 that stores a set of one or more reference videos for comparison with a test video, also referred to herein as an input video. The reference video(s) stored in the reference video library 105 can correspond to any type(s) of video(s) obtained from any type(s) of source(s). For example, the reference videos stored in the reference video library 105 can include videos of broadcast, on-demand and/or online media contact capable of being selected for viewing by viewers, videos of advertisements captured from broadcast, on-demand and/or online media content, videos of product placements observed in television programming, etc. The reference video library 105 can correspond to any type or combination of temporary and/or permanent tangible storage media, such as one or more of cache, volatile memory, flash memory, disk storage, etc., including but not limited to one or more of the mass storage devices 1330 and/or volatile memory 1318 in the example processing system 1300 of FIG. 13, which is described in greater detail below.

The example video comparison system 100 also includes an example video frame sampler 110 to sample or otherwise obtain a respective sequence of video frames from a respective reference video stored in the reference video library 105. The video frame sampler 110 samples a particular reference video at a frame rate, resolution and duration to obtain the sequence of video frames for the reference video. In some examples, the frame rate, resolution and/or duration that determine how the video frame sampler 110 is to sample reference video(s) can be specified as variable input parameters to the video comparison system 100 (e.g., to trade-off accuracy vs. processing speed). Additionally or alternatively, one or more of these parameters can be configuration parameter(s) set during initialization of the video comparison system 100.

In some examples, the video comparison system 100 of FIG. 1 includes an example composite reference image storage 115 to store a composite reference image formed by combining the sequence of video frames (also referred to herein as the sequence of reference video frames) obtained by the video frame sampler 110 for a particular reference video. For example, the video frame sampler 110 can tile reference video frames in the sequence of video frames for a particular reference video to form a tiled array of reference video frames representing the reference video. This tiled array of reference video frames is stored in the composite reference image storage 115 as the respective composite reference image for this particular reference video. The horizontal and vertical dimensions (e.g., in numbers of frames) for the tiled image arrays forming the composite reference images stored in the composite reference image storage 115 can be specified as variable input parameters to the video comparison system 100 and/or can be configuration parameter(s) set during initialization of the video comparison system 100.

In some examples, the video frame sampler 110 may sample a subset of the reference video frames from the sequence of reference video frames to form a composite reference image representing the reference video. In such examples, the video frame sampler 110 may obtain reference video frames at a video frame rate (e.g., 30 frames per second or some other frame rate) and then sample a subset of these reference video frames at sampled frame times (t) corresponding to a subset of the frame times (e.g., time boundaries corresponding to a 1/30 second sampling interval or some other frame sampling interval) at which the reference video frames are obtained. For example, the video frame sampler 110 can sample (e.g., select) reference video frames at sampled frame times that are selected randomly from the set of frame times at which the reference video frames exist (also referred to herein as random sampling), and/or that are selected uniformly from the set of frame times at which the reference video frames exist (also referred to herein as uniform sampling), etc. Additionally or alternatively, in some examples, the video frame sampler 110 may include sampled pixel(s) and/or subregion(s) of a particular reference video frame, rather than the entire reference video frame, in the reference composite image. For example, the video frame sampler 110 may select pixel(s) (and/or subregion(s)) of reference video frames having specified or otherwise determined shape(s) and size(s) (e.g., rectangular)) at specified or otherwise determined horizontal (x) and vertical (y) integer pixel coordinates(s), and at sampled frame times (t) selected (e.g., randomly or uniformly) from the set of valid reference video frame times (e.g., 1/30 second time intervals), for inclusion in a sequence or array of reference video frames forming the composite reference image representing the reference video. The composite reference image storage 115 can correspond to any type or combination of temporary and/or permanent tangible storage media, such as one or more of cache, volatile memory, flash memory, disk storage, etc., including but not limited to one or more of the mass storage devices 1330 and/or volatile memory 1318 in the example processing system 1300 of FIG. 13, which is described in greater detail below.

The video comparison system 100 of the illustrated example includes an example histogram generator 120 to generate a respective reference color histogram for each reference video included in the set of reference videos stored in the reference video library 105. The resulting set of one or more reference color histograms generated by the histogram generator 120 are stored in an example reference histogram library 125 included in the video comparison system 100. For example, a reference color histogram generated by the histogram generator 120 for a particular reference video includes a set of bins (also referred to herein as color bins) representing a respective set of possible colors that may be included in the sequence of video frames obtained by the video frame sampler 110 for the reference video. For a particular bin corresponding to a particular color (or, in other words, a particular color bin), the histogram generator 120 determines a bin value for the color bin that represents a count of the number of pixels of the reference video frames included in the sequence of video frames for the particular reference video (or a sampled version/subset of the sequence of reference video frames) having the particular color associated with the color bin. In some examples, the histogram generator 120 processes reference video frames (and/or sampled pixels(s)/subregion(s) of the reference video frames) individually (e.g., sequentially as the frames and/or sampled pixels(s)/subregion(s) are obtained and/or buffered by the video frame sampler 110) to count pixel colors and update the reference color histogram for a particular reference video being processed. In such examples, the composite reference image storage 115 and any composite image processing by the video frame sampler 110 can be omitted from the video comparison system 100. In other examples (e.g., in which the composite reference image storage 115 is present), the histogram generator 120 processes the respective composite reference image determined for the particular reference video to determine the respective reference color histogram for the reference video. The reference histogram library 125 used to store the set of reference color histograms generated by the histogram generator 120 can correspond to any type or combination of temporary and/or permanent tangible storage media, such as one or more of cache, volatile memory, flash memory, disk storage, etc., including but not limited to one or more of the mass storage devices 1330 and/or volatile memory 1318 in the example processing system 1300 of FIG. 13, which is described in greater detail below.

In the example of FIG. 1, the video comparison system 100 uses the set of reference histograms stored in the reference histogram library 125 to compare a reference video stored in the reference video library 105 with a test video (also referred to herein as an input video) obtained via an example test video interface 130. For example, the video comparison system 100 determines whether the test video obtained via the test video interface 130 matches a selected reference video stored in the reference video library 105 and, if so, identifies that the matching reference video is the same as or is at least similar to the test video. The test video interface 130 can be implemented by, for example, a camera or other image sensing device to capture a video of a display of a multimedia presentation device (e.g., a television, computer monitor, smartphone, etc.) in the viewing field of the camera/imaging device, etc. Additionally or alternatively, the test video interface 130 can be configured to electrically, optically or otherwise communicatively couple with a video output of the multimedia presentation device. Additionally or alternatively, the test video interface 130 can be implemented by a computer or other processing device configured to obtain test videos from one or more network sources (e.g., servers) communicatively coupled to the test video interface 130 (e.g., via the Internet and/or one or more other networks).

Figure 2:
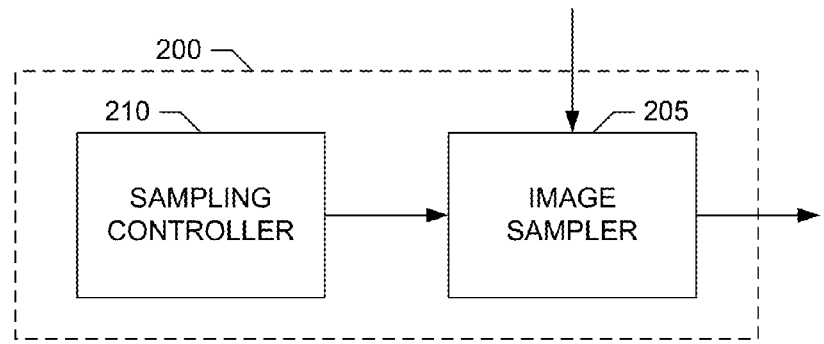
FIG. 2 is a block diagram of an example video frame sampler for sampling a sequence of video frames of a video in the example video comparison system of FIG. 1.

The example video comparison system 100 also includes an example video frame sampler 135 to sample or otherwise obtain a respective sequence of video frames from the test video obtained via the test video interface 130. Like the video frame sampler 110, the video frame sampler 135 samples the test video at a frame rate, resolution and duration to obtain the sequence of video frames for the test video. In some examples, the frame rate, resolution and/or duration that determine how the video frame sampler 135 is to sample the test video can be specified as variable input parameters to the video comparison system 100 (e.g., to trade-off accuracy vs. processing speed). Additionally or alternatively, one or more of these parameters can be configuration parameter(s) set during initialization of the video comparison system 100. The frame rate, resolution and/or duration of the sequence of video frames obtained by the video frame sampler 135 for the test video can be the same as or different from the frame rate, resolution and/or duration of the sequence of video frames obtained by the video frame sampler 110 for a reference video to be compared with the test video. In some examples, the video frame samplers 110 and 135 may be implemented by the same video frame sampler, whereas in other examples, the video frame samplers 110 and 135 may be implemented by different video frame samplers. An example implementation of the video frame samplers 110 and 135 is illustrated in FIG. 2, which is described in greater detail below.

In some examples, the video comparison system 100 of FIG. 1 includes an example composite test image storage 140 to store a composite test image formed by combining the sequence of video frames (also referred to herein as the sequence of test video frames) obtained by the video frame sampler 135 for the test (e.g., input) video. For example, the video frame sampler 135 can tile test video frames in the sequence of video frames of the test video to form a tiled array of test video frames representing the test video. This tiled array of test video frames is stored in the composite test image storage 140 as the respective composite test image for this particular test (e.g., input) video. The horizontal and vertical dimensions (e.g., in numbers of frames) for the tiled image array forming the composite test image stored in the composite test image storage 140 can be specified as variable input parameters to the video comparison system 100 and/or can be configuration parameter(s) set during initialization of the video comparison system 100. Furthermore, the horizontal and vertical dimensions for the composite test image stored in the composite test image storage 140 can be the same as or different from the horizontal and vertical dimensions for the composite reference image(s) stored in the composite reference image storage 115.

In some examples, the video frame sampler 135 may sample a subset of the test video frames from the sequence of test video frames to form a composite test image representing the test video. In such examples, the video frame sampler 135 may obtain test video frames at a video frame rate (e.g., 30 frames per second or some other frame rate) and then sample a subset of these test video frames at sampled frame times (t) corresponding to a subset of the frame times (e.g., time boundaries corresponding to a 1/30 second sampling interval or some other frame sampling interval) at which the test video frames are obtained. For example, the video frame sampler 135 can sample (e.g., select) test video frames at sampled frame times that are selected randomly from the set of frame times at which the test video frames exist (also referred to herein as random sampling times), and/or that are selected uniformly from the set of frame times at which the test video frames exist (also referred to herein as uniform sampling times), etc. Additionally or alternatively, in some examples, the video frame sampler 135 may include sampled pixel(s) and/or subregion(s) of a particular test video frame, rather than the entire test video frame, in the test composite image. For example, the video frame sampler 135 may select pixel(s) (and/or subregion(s)) of test video frames having specified or otherwise determined shape(s) and size(s) (e.g., rectangular)) at specified or otherwise determined horizontal (x) and vertical (y) integer pixel coordinates (s), and at sampled frame times (t) selected (e.g., randomly or uniformly) from the set of valid test video frame times (e.g., 1/30 second time intervals), for inclusion in a sequence or array of test video frames forming the composite test image representing the test video. The composite test image storage 140 can correspond to any type or combination of temporary and/or permanent tangible storage media, such as one or more of cache, volatile memory, flash memory, disk storage, etc., including but not limited to one or more of the mass storage devices 1330 and/or volatile memory 1318 in the example processing system 1300 of FIG. 13, which is described in greater detail below. Furthermore, the reference video library 105, the composite reference image storage 115, the reference histogram library 125 and the composite test image storage 140 can be implemented by the same or different storage media.

Figure 4:
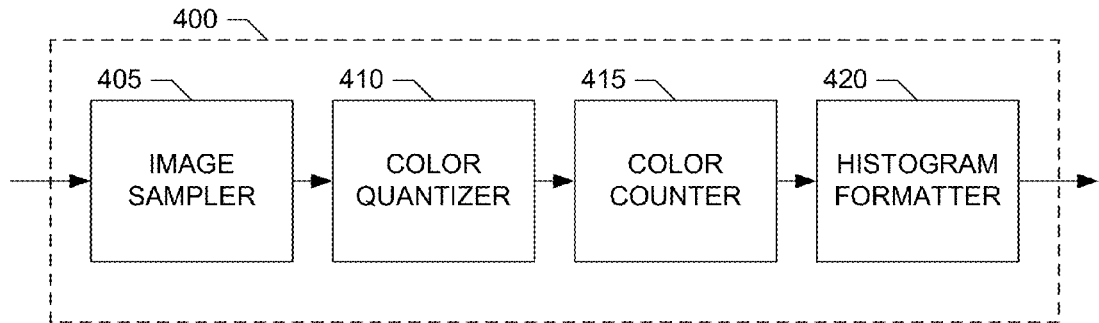
FIG. 4 is a block diagram of an example histogram generator for generating color histograms in the example video comparison system of FIG. 1.

The video comparison system 100 of the illustrated example includes an example histogram generator 145 to generate a color histogram for the test video obtained from the test video interface 130. As such, the color histogram generated by the histogram generator 145 for the test video is also referred to herein as the test color histogram. Similar to the reference color histogram(s) generated by the histogram generator 120, a test color histogram generated by the histogram generator 145 for the test video includes a set of bins (e.g., color bins) representing a respective set of possible colors that may be included in the sequence of video frames obtained by the video frame sampler 135 for the test video. For a particular bin corresponding to a particular color (e.g., for a particular color bin), the histogram generator 145 determines a bin value for the color bin that represents a count of the number of pixels of the test video frames included in the sequence of video frames for the test video (or a sampled version/subset of the sequence of test video frames) having the particular color associated with the color bin. In some examples, the histogram generator 145 processes test video frames (and/or sampled pixels(s)/subregion(s) of the test video frames) individually (e.g., sequentially as the frames and/or sampled pixels(s)/subregion(s) are obtained and/or buffered by the video frame sampler 135) to count pixel colors and update the test color histogram for the test video being processed. In such examples, the composite test image storage 140 and any composite image processing by the video frame sampler 135 can be omitted from the video comparison system 100. In other examples (e.g., in which the composite test image storage 140 is present), the histogram generator 145 processes the respective composite test image determined for the test image to determine the test color histogram for the test video. In some examples, the histogram generators 120 and 145 may be implemented by the same histogram generator, whereas in other examples, the histogram generators 120 and 145 may be implemented by different histogram generators. An example implementation of the histogram generators 120 and 145 is illustrated in FIG. 4, which is described in greater detail below.

The example video comparison system 100 of FIG. 1 includes an example histogram comparator 150 to compare the test color histogram generated by the histogram generator 145 for the test video with a reference color histogram stored in the reference histogram library 125 for a particular (e.g., selected) reference video to be compared with the test video. In some examples, the histogram comparator 150 determines one or more comparison metrics that quantify the results of comparing a particular reference video with the test video. For example, the histogram comparator 150 determines a first comparison metric quantifying comparison of a particular reference video with the test video based on differences between bin values of the reference color histogram for the particular reference video and adjusted bin values of the test color histogram. As described in greater detail below, the histogram comparator 150 determines adjusted bin values of the test color histogram based on comparing scaled bin values of the test color histogram with the bin values of the reference color histogram for the particular reference video. Because the adjusted bin values are determined based on the bin values of the particular reference color histogram, the histogram comparator 150 may determine different test histogram adjusted bin values when comparing the test video to different reference videos.

In some examples, the histogram comparator 150 determines a second comparison metric quantifying comparison of the particular reference video with the test video by swapping the roles of the reference color histogram and the test color histogram in determining the comparison metric. In other words, in such an example, the histogram comparator 150 determines the second comparison metric based on differences between bin values of the test color histogram and adjusted bin values of the reference color histogram for the particular reference video being compared with the test video. For example, similar to determining the adjusted bin values of the test color histogram, the histogram comparator 150 determines adjusted bin values of the reference color histogram for the particular reference video based on comparing scaled bin values of the reference color histogram with the bin values of the test color histogram.

Adjustment of test color histogram bin values (and reference color histogram bin values, in some examples), as described in greater detail below, can permit the video comparison system 100 to identify matching videos (e.g., videos that are identical or at least having similar content) even when the color histograms for the videos are different if, for example, the respective bin values of the two color histograms for the color bins are within a scale factor of each other. Such adjustment of the bin values of the test and/or reference color histograms can enable the video comparison system 100 to identify groups of similar, but not identical, video content, such as: (1) groups of commercial advertisements having the same video but different audio tracks; (2) groups of commercial advertisements having minor producer modifications, such as one scene being replaced with a different scene in an otherwise similar advertisement; (3) groups of commercial advertisements in which different text is overlaid on the same video content; (4) groups of video clips corresponding to the same content but with different network logos overlaid different video clips; (5) groups of video clips corresponding to the same content but truncated to different lengths; (6) groups of video clips corresponding to the same content but having different image/frame sizes; etc. In some examples, the scale factor is used to determine the scaled bin values of a particular color histogram (from which the adjusted bin values are determined). In such examples, the scale factor can be specified as a variable input parameter to the video comparison system 100 (e.g., to trade-off false matching vs. missed matching results during system operation). Additionally or alternatively, the scale factor can be a configuration parameter that is set during initialization of the video comparison system 100.

The histogram comparator 150 of the illustrated example also processes the one or more comparison metrics to determine whether the test video obtained via the test video interface 130 matches the particular reference video selected from the reference video library 105. For example, the histogram comparator 150 may determine that the test video matches the particular reference video stored in the reference video library 105 if at least one of the comparison metrics quantifying comparison of the reference video with the test video is less than or equal to a threshold. In some examples, the threshold can be specified as a variable input parameter to the video comparison system 100 (e.g., to trade-off false matching vs. missed matching results during system operation). Additionally or alternatively, the threshold can be a configuration parameter that is set during initialization of the video comparison system 100.

In the illustrated example of FIG. 1, the video comparison system 100 further includes an example results interface 155 to provide the results of comparing the test video obtained via the test video interface 130 to a particular reference video selected from the reference video library 105. For example, the results interface 155 reports or otherwise outputs the video comparison results using any appropriate data format for presentation to a user and/or sending to a receiving device. For example, the results interface 155 indicates whether the test video has been determined to match a selected reference video stored in the reference video library 105. In some examples, the results interface 155 also reports the comparison metric(s) associated with the matching reference video.

A block diagram of an example video frame sampler 200 that may be used to implement either or both of the video frame samplers 110 and/or 135 of FIG. 1 is illustrated in FIG. 2. The video frame sampler 200 of the illustrated example includes an example image sampler 205 to capture or otherwise sample a sequence of video frames from a video input to the video frame sampler 200 (e.g., such as a reference video or a test video as described above). In the illustrated example, the image sampler 205 samples the input video at a frame rate, resolution and duration that are configured by an example sampling controller 210. In some examples, the sampling frame rate, resolution and duration parameters may be variable input parameters and/or initial configuration parameters (or a combination thereof) provided to sampling controller 210. For example, the sampling controller 210 can be configured with sampling frame rate, resolution and duration parameters to cause the image sampler 205 to sample an input image at a frame rate of one frame every $1/5=0.2$ seconds (or some other rate), with a frame resolution of 128×128 pixels (or some other resolution) and a duration of 30 seconds (or some other duration).

Figure 3A:
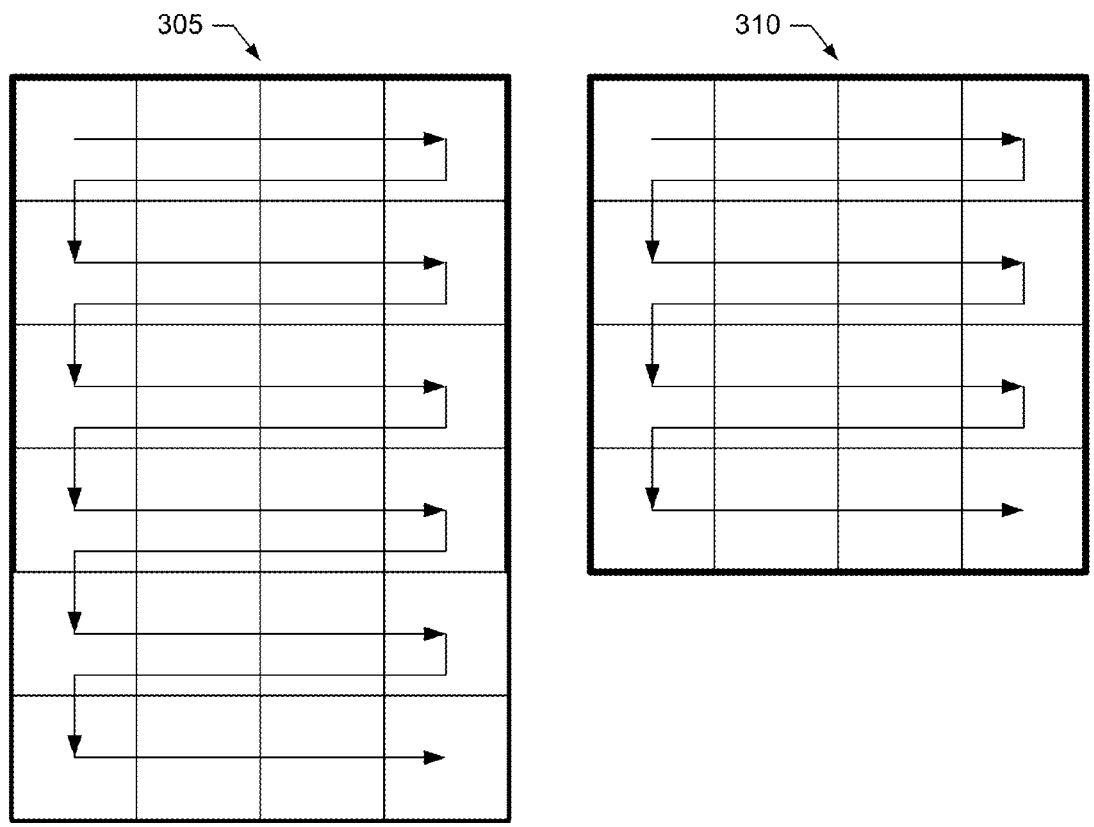
FIGS. 3A-3B illustrate example video frame sampling operations that may be performed by the example video frame sampler of FIG. 2.
Figure 3B:
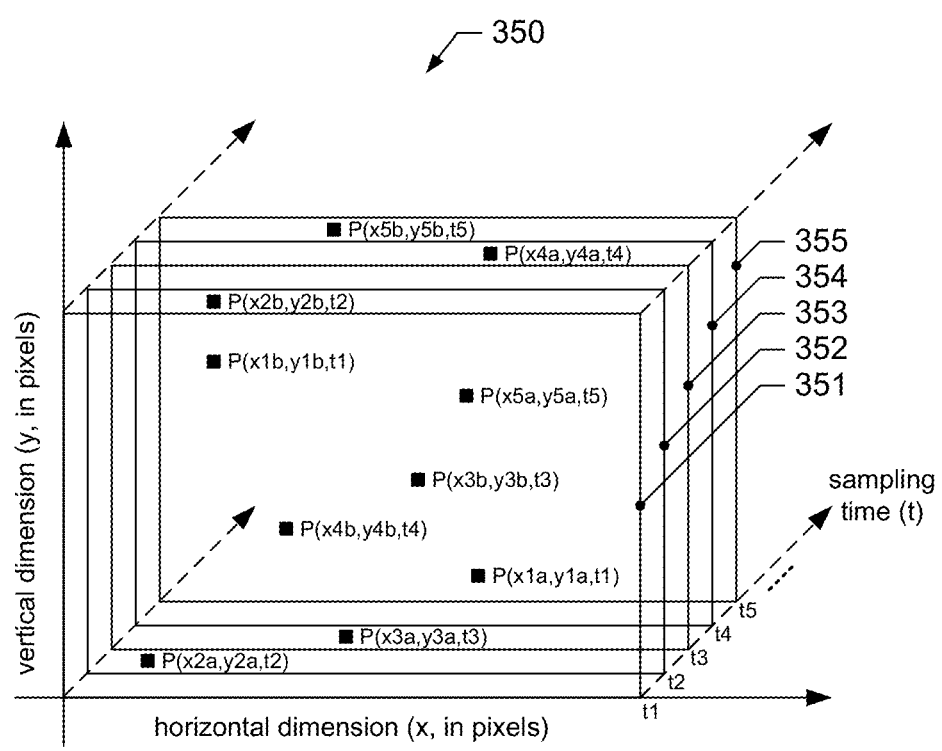

Example video frame sampling operations that may be performed by the example video frame sampler 200 of FIG. 2 are illustrated in FIGS. 3A-B. In particular, FIG. 3A illustrates example composite images 305 and 310 that may be formed by the video frame sampler 200 for different respective input videos. The composite images 305 and 310 may be processed by, for example, the histogram generators 120 and/or 145 to generate color histograms for the input videos represented by the composite images 305 and 310, as described above. For example, the composite image 305 may be a composite reference image corresponding to a reference video sampled by the video frame sampler 200 implementing the video frame sampler 110 of FIG. 1, and the composite image 310 may be a composite test image corresponding to a test video sampled by the video frame sampler 200 implementing the video frame sampler 135 of FIG. 1. In the illustrated example composite image 305, the video frame sampler 200 tiles the reference video frames in the sequence of video frames sampled from the reference video into a tiled array containing rows of four (4) reference video frames, with the number of rows determined by the duration and sampling rate used to sample the reference video. In the illustrated example composite image 310, the video frame sampler 200 tiles the test video frames in the sequence of video frames sampled from the test video into a tiled array containing rows of four (4) test video frames, with the number of rows determined by the duration and sampling rate used to sample the test video.

As illustrated in the examples of FIG. 3A, the sizes of the composite images determined for different videos may be different based on, for example, different frame rate, resolution and duration parameters used to configure the sampling of different videos. In examples in which the video frame sampler 200 forms composite images for sampled videos, such as the composite images 305 and/or 310, the composite image for a particular video can be processed, as described above and in further detail below, to determine a color histogram for the particular video. In other examples, the video frame sampler 200 may not form a composite image for a particular video and, instead, the color histogram for the particular video is formed by processing the sequence of video frames sampled from the video (and/or sampled pixels(s)/subregion(s) of the video frames) individually and accumulating the bin counts for the different video frames to form the color histogram for the particular video.

FIG. 3B illustrates an example operation 350 of the video frame sampler 200 of FIG. 2 in which the video frame sampler 200 samples pixel(s) (and/or subregion(s)) of video frames of a video (possibly after buffering) to form the sequence of pixels (or the composite image) from which the color histogram representative of the video is to be determined. As illustrated in the example of FIG. 3B, the video frame sampler 200 samples (e.g., selects) pixel(s) (and/or subregion(s)) at horizontal (x) and vertical (y) integer pixel coordinates(s), and at sampled frame times (t) selected (e.g., randomly or uniformly) from the set of valid frame times (e.g., 1/30 second time intervals) for the video frames of the video. For example, in the operation 350, the video frame sampler 200 selects video frames 351-355 at sampled frame times t1-t5, respectively. For frame 351 having sampled time t1, the video frame sampler 200 samples (e.g., selects) pixels (or regions) at pixel coordinates (x1$a$, y1$a$) and (x1$b$, y1$b$). Similarly, the video frame sampler 200 samples pixels (or regions) at pixel coordinates (x2a, y2a) and (x2b, y2b) for frame 352 having sampled time t2, samples pixels (or regions) at pixel coordinates (x3a, y3a) and (x3b, y3b) for frame 353 having sampled time t3, samples pixels (or regions) at pixel coordinates (x4a, y4a) and (x4b, y4b) for frame 354 having sampled time t4, and samples pixels (or regions) at pixel coordinates (x5a, y5a) and (x5b, y5b) for frame 355 having sampled time t5. The pixels (or regions) at pixel coordinates (x1a, y1a), (x1b, y1b), (x2a, y2a), (x2b, y2b), (x3a, y3a), (x3b, y3b), (x4a, y4a), (x4b, y4b), (x5a, y5a) and (x5b, y5b) are then included in the sequence of pixels (or composite image) from which the color histogram representative of the video is to be determined. Although the same number of pixels (or regions) are sampled from each of the sampled video frames in the illustrated example operation 350, in other example implementations, the video frame sampler 200 can sample different numbers of pixels (or regions) from different video frames of the video for which a color histogram is to be determined.

A block diagram of an example histogram generator 400 that may be used to implement either or both of the histogram generators 120 and/or 145 of FIG. 1 is illustrated in FIG. 4. The histogram generator 400 of the illustrated example includes an example image sampler 405 to sample an input image to determine a set of pixels of the image. The input image samples by the image sampler 405 can correspond to a composite image (e.g., such as a composite reference image or a composite test image, as described above) or a video frame sampled from a video (e.g., such as a reference video frame sampled from a reference video or a test video frame sampled from a test video). For example, the image sampler 405 can sample a subset or all of the pixels of the input image to obtain the set of pixels from which the color histogram is to be determined for the video from which the input image was obtained. In some examples, the image sampler 405 employs uniform sampling to sample a number of pixels (e.g., such as 1000 or some other number) that are uniformly-spaced in the input image (e.g., and that form a uniformly spaced grid of pixels in the image) to obtain the sampled set of pixels of the image. In other examples, the image sampler 405 employs random sampling to randomly sample a number of pixels (e.g., such as 1000 or some other number) in the input image to obtain the sampled set of pixels of the image. In some examples, the image sampler 405 can be omitted and all of the pixels of the image are included in the set of pixels processed by the histogram generator 400 to determine the color histogram for the video corresponding to the input image.

The histogram generator 400 of FIG. 4 also includes an example color quantizer 410 to quantize the color values of the pixels in the set of pixels of the input image. Each pixel of the image is associated with a set of color values, such as three color values corresponding to a red color value, a green color value and a blue color value. In the illustrated example, the color quantizer 410 quantizes each color value of a pixel into a set of levels. For example, the color quantizer 410 may use any appropriate quantization technique to quantize the red color value of each pixel into R intensity levels, the green color value of each pixel into G intensity levels, and the blue color value of each pixel into B intensity levels. The values of R, G and B can be the same or different, and may be variable input parameters and/or initial configuration parameters of the histogram generator 400.

The number of levels into which the color quantizer 410 quantizes each color value determines the resulting number of possible color combinations that can be represented by the quantized pixels, which corresponds to the number of color bins of the color histogram determined by the histogram generator 400. In other words, the aforementioned quantization of the red, green and blue color values yields R×G×B color combinations and, thus, the color histogram determined by the histogram generator 400 of the illustrated example has R×G×B color bins. For example, if R=G=B=8, then the total number of possible color combinations and, thus, the total number of color bins is 8×8×8=512. Color quantization as performed by the color quantizer 410 can reduce processing requirements and improve video matching robustness, such as in circumstances in which small color variations between videos occur due to, for example, video frame smoothing and/or other processing of the test and/or reference videos.

In other examples, the quantized color values of a particular pixel are combined (e.g., concatenated) with the quantized color values of one or more other pixels in a neighborhood of the particular pixel to determine the quantized color combination for the particular pixel. The value of the quantized color combination for the particular pixel (e.g., the value obtained by combining the quantized color values of the particular pixel with those of the neighboring pixel(s)) then determines the histogram color bin in which the pixel is to be included. Like before, the resulting number of possible color combinations that can be represented by the combination of quantized pixels in a neighborhood corresponds to the number of color bins of the color histogram determined by the histogram generator 300. In other words, if the quantized color values of a particular pixel are combined with the quantized color values of N-1 neighboring pixels, then the number of possible color combinations associated with combining the neighboring quantized pixels and, thus, the number if color histogram bins is $(R \times G \times B)^N$. For example, if R=G=B=2 (corresponding to binary, or 1 bit, quantization) and the quantized color values of a particular pixel are combined with the quantized color values of a first neighbor pixel located a first number (e.g., 5 or some other number) of pixels up from the particular pixel and a second neighbor pixel located a second number (e.g., 5 or some other number) of pixels to the left of the particular pixel, then the total number of possible color combinations for the combination of a pixel with its N-1 neighboring pixels and, thus, the total number of color bins is $(2 \times 2 \times 2)^3 = 512$.

In the illustrated example, the histogram generator 400 includes an example color counter 415 to count the numbers of times each possible quantized color combination appears in the sampled set of pixels of the input image. For example, the color counter 415 can store each possible color combination that can be exhibited by the quantized pixels as a respective element of a data array (e.g., with the integer value of a particular color combination forming the index for its respective element in the data array). In such an example, the color counter 415 increments the values of the array elements to count the numbers of times each different color combination appears in the quantized set of pixels. To determine a color histogram corresponding to a particular video, the color counter 415 further increments the values of the array elements to count the numbers of times each different color combination appears in the respective, quantized sets of pixels for the input frames forming the sequence of input frames sampled from the particular video and applied to the histogram generator 400 for processing. The resulting counts of the different color combinations appearing in the quantized sets of pixels of the sequence of input images forms the color histogram of the video corresponding to this sequence of input images.

An example histogram formatter 420 is included in the histogram generator 420 to format the color histogram determined by the image sampler 405, the color quantizer 410 and the color counter 415 for subsequent processing. For example, the histogram formatter 420 may output a data array in which each element is indexed by a respective possible color combination and in which the element values correspond to the counts of the different color combinations appearing in the sequence of video frames sampled from a particular video and processed by the histogram generator 400. In some examples, the histogram formatter 420 may format the data array into a numeric value that may be used as a signature or, in other words, a color histogram signature, of the video corresponding to the sequence of input images. For example, the histogram formatter 420 may concatenate the bin values of the data array representing the video's color histogram into a numeric value (e.g., such as a binary value) forming the color histogram signature of the video.

Figure 5:
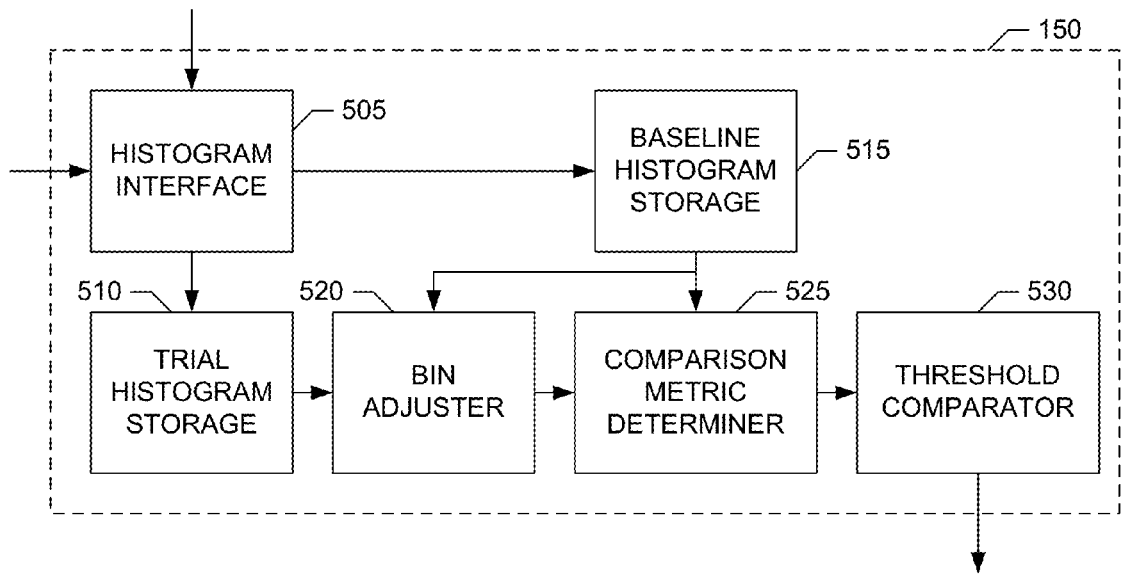
FIG. 5 is a block diagram of an example histogram comparator for comparing color histograms in the example video comparison system of FIG. 1.

A block diagram of an example implementation of the histogram comparator 150 of FIG. 1 is illustrated in FIG. 5. The histogram comparator 150 of FIG. 5 includes an example histogram interface 505 to obtain a color histogram of a test video (also referred to herein as the test color histogram) that is to be compared with a color histogram of a reference video (also referred to herein as the reference color histogram) also obtained via the example histogram interface 505. For example, the histogram interface 505 may receive the test color histogram from the histogram generator 145, and the histogram interface 505 may receive the reference color histogram from the histogram generator 120 and/or the reference histogram library 125. The histogram interface 505 can be implemented by any type(s) of data interface(s), communication bus(ses), function(s), module(s), etc., capable of receiving the color histograms and/or color histogram signatures from the histogram generators 120, 145 and/or 400.

In the illustrated example, the histogram interface 505 enables the histogram comparator 150 to determine multiple comparison metrics quantifying comparison of a reference video corresponding to a reference color histogram applied to the histogram interface 505 with a test video corresponding to a test color histogram applied to the histogram interface 505. In particular, the histogram comparator 150 of the illustrated example determines a comparison metric based on differences between bin values of a baseline color histogram corresponding to a first video and adjusted bin values of a trial color histogram corresponding to a second video. In the context of determining comparison metrics quantifying comparison of a reference video with a test video, the histogram comparator 150 enables different comparison metrics to be determined by assigning, for example, the reference color histogram to be the baseline color histogram and the test color histogram to be the trial color histogram to determine a first comparison metric, and then assigning the test color histogram to be the baseline color histogram and the reference color histogram to be the trial color histogram to determine a second comparison metric. In the illustrated example, the input color histogram (e.g., reference or test color histogram) assigned to be the trial color histogram is stored in an example trial histogram storage 510, and the input color histogram (e.g., reference or test color histogram) assigned to be the baseline color histogram is stored in an example baseline histogram storage 515. The trial histogram storage 510 and the baseline histogram storage 515 can correspond to any type or combination of temporary and/or permanent tangible storage media, such as one or more of cache, volatile memory, flash memory, disk storage, etc., including but not limited to one or more of the mass storage devices 1330 and/or volatile memory 1318 in the example processing system 1300 of FIG. 13, which is described in greater detail below.

The example histogram comparator 150 of FIG. 5 also includes an example bin adjuster 520 to determine adjusted bin values of the trial color histogram that are based on the bin values of the baseline color histogram and a scale factor. In the illustrated example, the bin adjuster 520 determines the adjusted bin values of the trial color histogram by scaling bin values of the trial color histogram by a scale factor (e.g., such as a scale factor of 2 or another value) to determine scaled bin values of the trial color histogram. As noted above, the scale factor can be a variable input parameter, a configuration parameter set during initialization, etc. Using the scaled bin values, the bin adjuster 520 compares the scaled bin values of the trial color histogram to the respective bin values of the baseline color histogram to determine the adjusted bin values of the trial color histogram.

For example, the bin adjuster 520 can determine an adjusted bin value of the trial color histogram to be the smaller of the respective scaled bin value of the trial color histogram or the respective bin value of the baseline color histogram. Mathematically, such an adjusted bin value for a particular color combination C in the test color histogram can be determined using Equation 1, which is:

$$\text{AdjustedHistogramTrial}[C] = \min\{K \times \text{HistogramTrial}[C], \text{HistogramBaseline}[C]\}. \quad \text{Equation 1}$$

Figure 6:
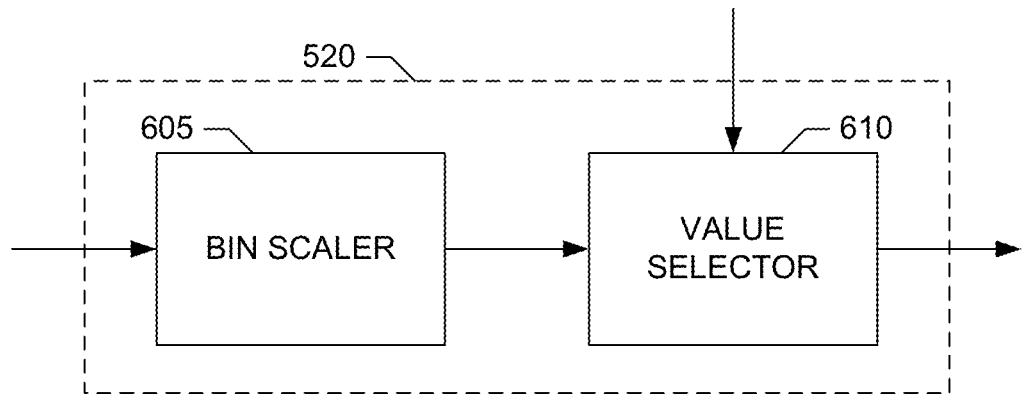
FIG. 6 is a block diagram of an example bin adjuster that may be used to implement the example histogram comparator of FIG. 5.

In Equation 1, HistogramTrial[C] corresponds to the bin value for the color combination C in the trial color histogram, HistogramBaseline[C] corresponds to the bin value for the color combination C in the baseline color histogram, K is the scale factor used to scale the bin values of the trial color histogram to determine the scaled bin values, min{ } is a function that selects a minimum value from a set of input values, and AdjustedHistogramTrial[C] is the resulting adjusted bin value for the color combination C in the trial color histogram. An example implementation of the bin adjuster 520 is illustrated in FIG. 6, which is described in greater detail below.

The illustrated example histogram comparator 150 of FIG. 5 further includes an example comparison metric determiner 525 to determine a comparison metric based on differences between bin values of the baseline color histogram and the adjusted bin values of the trial color histogram. In some examples, the metric determiner 525 determines the comparison metrics by determining the differences between the bin values of the baseline color histogram and the respective adjusted bin values of the trial color histogram for the same color combinations and summing the differences to determine the comparison metric. In such examples, the difference between the bin value for the color combination C in the baseline color histogram and the respective adjusted bin value for the color combination C in the trial color histogram can be represented mathematically as the quantity Difference[C] and determined using Equation 2, which is:

$$\text{Difference}[C] = \text{HistogramBaseline}[C] - \min\{K \times \text{HistogramTrial}[C], \text{HistogramBaseline}[C]\}. \quad \text{Equation 2}$$

Using Equation 2, the comparison metric can be represented mathematically as the quantity ComparisonMetric and determined mathematically by summing the differences between the bin values of the baseline color histogram and the respective adjusted bin values of the trial color histogram in accordance with Equation 3, which is:

$$\text{ComparisonMetric} = \text{sum}_C\{\text{Difference}[C]\} = \text{sum}_C\{\text{HistogramBaseline}[C] - \min\{K \times \text{HistogramTrial}[C], \text{HistogramBaseline}[C]\}\}. \quad \text{Equation 3}$$

Figure 7:
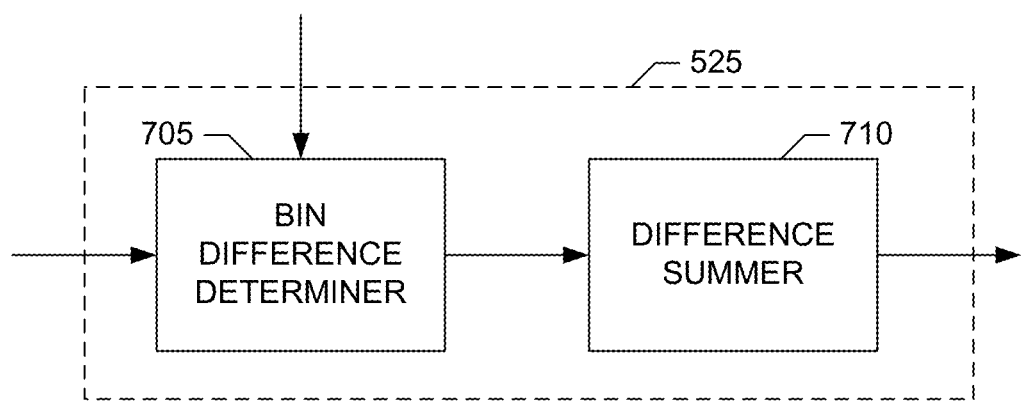
FIG. 7 is a block diagram of an example comparison metric determiner that may be used to implement the example histogram comparator of FIG. 5.

In Equation 3, $\text{sum}_C\{\ \}$ denotes the sum over the set of possible color combinations {C} represented by the trial and baseline color histograms. An example implementation of the comparison metric determiner 525 is illustrated in FIG. 7, which is described in greater detail below.

In the illustrated example, the bin adjuster 520 and the comparison metric determiner 525 determine two comparison metrics quantifying comparison of the reference color histogram applied to the histogram interface 505 for a selected reference video with the test color histogram applied to the histogram interface 505 for a test video. For the first comparison metric, the reference color histogram for the reference video is assigned to be the baseline color histogram (whose bin values are not adjusted), and the test color histogram for the test video is assigned to be the trial color histogram (whose bin values are adjusted). For the second comparison metric, the test color histogram for the test video is assigned to be the baseline color histogram (whose bin values are not adjusted), and the reference color histogram for the reference video is assigned to be the trial color histogram (whose bin values are adjusted).

An example threshold comparator 530 is included in the example histogram comparator 150 of FIG. 5 to compare the comparison metric(s) obtained from the comparison metric determiner 525 to a threshold to determine whether the particular reference video associated with input reference color histogram matches the test video associated with the input test color histogram. As noted above, the threshold can be a variable input parameter, a configuration parameter set during initialization, etc. In the illustrated example, the threshold comparator 530 indicates that the particular reference video is a match to the test video if either or both of the first comparison metric (corresponding to the reference color histogram being the baseline color histogram and the test color histogram being the trial color histogram) and/or the second comparison metric (corresponding to the test color histogram being the baseline color histogram and the reference color histogram being the trial color histogram) is/are less than or equal to the threshold. Otherwise, if both comparison metrics are greater than the threshold, the threshold comparator 530 indicates that this particular reference video is not a match to the test video.

A block diagram of an example implementation of the bin adjuster 520 of FIG. 5 is illustrated in FIG. 6. The example bin adjuster 520 of FIG. 6 includes an example bin scaler 605 and an example value selector 610. In the illustrated example, the bin scaler 605 determines the scaled bin values of the trial color histogram by scaling the trial color histogram's bin values by the scale factor, as described above. For example, the bin scaler 605 can determine the scaled bin value for a particular color combination C in the trial color histogram to be K×HistogramTrial[C], where HistogramTrial[C] corresponds to the bin value for the color combination C in the trial color histogram, and K is the scale factor used to scale the bin values of the trial color histogram to determine the scaled bin values.

The value selector 610 of the illustrated example determines the adjusted bin values of the trial color histogram to be the smaller of the scaled bin values of the trial color histogram as determined by the bin scaler 605 or the respective bin values of the baseline color histogram, as described above. For example, the value selector 610 can use Equation 1, which is described above, to select the adjusted bin value, AdjustedHistogramTrial[C], for the color combination C in the trial color histogram to be the minimum of either the scaled bin value, K×HistogramTrial[C], for this color combination C in the trial color histogram or the respective bin value, HistogramBaseline[C], for this color combination C in the baseline color histogram.

A block diagram of an example implementation of the comparison metric determiner 525 of FIG. 5 is illustrated in FIG. 7. The example comparison metric determiner 525 of FIG. 7 includes an example bin difference determiner 705 and an example difference summer 710. In the illustrated example, the bin difference determiner 705 determines the differences between bin values of the baseline color histogram and respective adjusted bin values of the trial color histogram for the same color combinations. For example, the bin difference determiner 705 can use Equation 2, which is described above, to determine, for each color combination C, the respective difference, Difference[C], between the bin value for the color combination C in the baseline color histogram and the respective adjusted bin value for the color combination C in the trial color histogram.

The difference summer 710 of the illustrated example determines the sum of the differences obtained from the bin difference determiner 705. For example, the difference summer 710 can use Equation 3, which is described above, to determine the sum, $\text{sum}_C\{\ \}$, of the differences, Difference[C], over the set of possible color combinations $\{C\}$. In the illustrated example, this sum forms the comparison metric that quantifies the result of comparing the trial color histogram and the baseline color histogram, as described above.

While example manners of implementing the video comparison system 100 have been illustrated in FIGS. 1-7, one or more of the elements, processes and/or devices illustrated in FIGS. 1-7 may be combined, divided, re-arranged, omitted, eliminated and/or implemented in any other way. Further, the example video frame samplers 110, 135 and/or 200, the example histogram generators 120, 145 and/or 400, the example test video interface 130, the example histogram comparator 150, the example results interface 155, the example image sampler 205, the example sampling controller 210, the example image sampler 405, the example color quantizer 410, the example color counter 415, the example histogram formatter 420, the example histogram interface 505, the example bin adjuster 520, the example comparison metric determiner 525, the example threshold comparator 530, the example bin scaler 605, the example value selector 610, the example bin difference determiner 705, the example difference summer 710 and/or, more generally, the example video comparison system 100 of FIGS. 1-7 may be implemented by hardware, software, firmware and/or any combination of hardware, software and/or firmware. Thus, for example, any of the example video frame samplers 110, 135 and/or 200, the example histogram generators 120, 145 and/or 400, the example test video interface 130, the example histogram comparator 150, the example results interface 155, the example image sampler 205, the example sampling controller 210, the example image sampler 405, the example color quantizer 410, the example color counter 415, the example histogram formatter 420, the example histogram interface 505, the example bin adjuster 520, the example comparison metric determiner 525, the example threshold comparator 530, the example bin scaler 605, the example value selector 610, the example bin difference determiner 705, the example difference summer 710 and/or, more generally, the example video comparison system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example video comparison system 100, the example video frame samplers 110, 135 and/or 200, the example histogram generators 120, 145 and/or 400, the example test video interface 130, the example histogram comparator 150, the example results interface 155, the example image sampler 205, the example sampling controller 210, the example image sampler 405, the example color quantizer 410, the example color counter 415, the example histogram formatter 420, the example histogram interface 505, the example bin adjuster 520, the example comparison metric determiner 525, the example threshold comparator 530, the example bin scaler 605, the example value selector 610, the example bin difference determiner 705 and/or the example difference summer 710 are hereby expressly defined to include a tangible computer readable medium such as a memory, digital versatile disk (DVD), compact disk (CD), Blu-ray disc™, etc., storing such software and/or firmware. Further still, the example video comparison system 100 as illustrated in FIGS. 1-7 may include one or more elements, processes and/or devices in addition to, or instead of, those illustrated in FIGS. 1-7, and/or may include more than one of any or all of the illustrated elements, processes and devices.

Flowcharts representative of example machine readable instructions for implementing the example video comparison system 100, the example video frame samplers 110, 135 and/or 200, the example histogram generators 120, 145 and/or 400, the example test interface 130, the example histogram comparator 150, the example results interface 155, the example image sampler 205, the example sampling controller 210, the example image sampler 405, the example color quantizer 410, the example color counter 415, the example histogram formatter 420, the example histogram interface 505, the example bin adjuster 520, the example comparison metric determiner 525, the example threshold comparator 530, the example bin scaler 605, the example value selector 610, the example bin difference determiner 705 and/or the example difference summer 710 are shown in FIGS. 8-12. In these examples, the machine readable instructions represented by each flowchart may comprise one or more programs for execution by a processor, such as the processor 1312 shown in the example processing system 1300 discussed below in connection with FIG. 13. The one or more programs, or portion(s) thereof, may be embodied in software stored on a tangible computer readable storage medium such as a CD-ROM, a floppy disk, a hard drive, a digital versatile disk (DVD), a Blu-ray disc™, or a memory associated with the processor 1312, but the entire program or programs and/or portions thereof could alternatively be executed by a device other than the processor 1312 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 8-12 may be implemented manually. Further, although the example machine readable instructions are described with reference to the flowcharts illustrated in FIGS. 8-12, many other methods of implementing the example video comparison system 100, the example video frame samplers 110, 135 and/or 200, the example histogram generators 120, 145 and/or 400, the example test interface 130, the example histogram comparator 150, the example results interface 155, the example image sampler 205, the example sampling controller 210, the example image sampler 405, the example color quantizer 410, the example color counter 415, the example histogram formatter 420, the example histogram interface 505, the example bin adjuster 520, the example comparison metric determiner 525, the example threshold comparator 530, the example bin scaler 605, the example value selector 610, the example bin difference determiner 705 and/or the example difference summer 710 may alternatively be used. For example, with reference to the flowcharts illustrated in FIGS. 8-12, the order of execution of the blocks may be changed, and/or some of the blocks described may be changed, eliminated, combined and/or subdivided into multiple blocks.

As mentioned above, the example processes of FIGS. 8-12 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). The tangible computer readable medium can be local to and/or remote from the processor(s), device(s), apparatus, etc., that is/are to execute the coded instructions. As used herein, the term tangible computer readable medium is expressly defined to include any type of computer readable storage and to exclude propagating signals. Additionally or alternatively, the example processes of FIGS. 8-12 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 8:
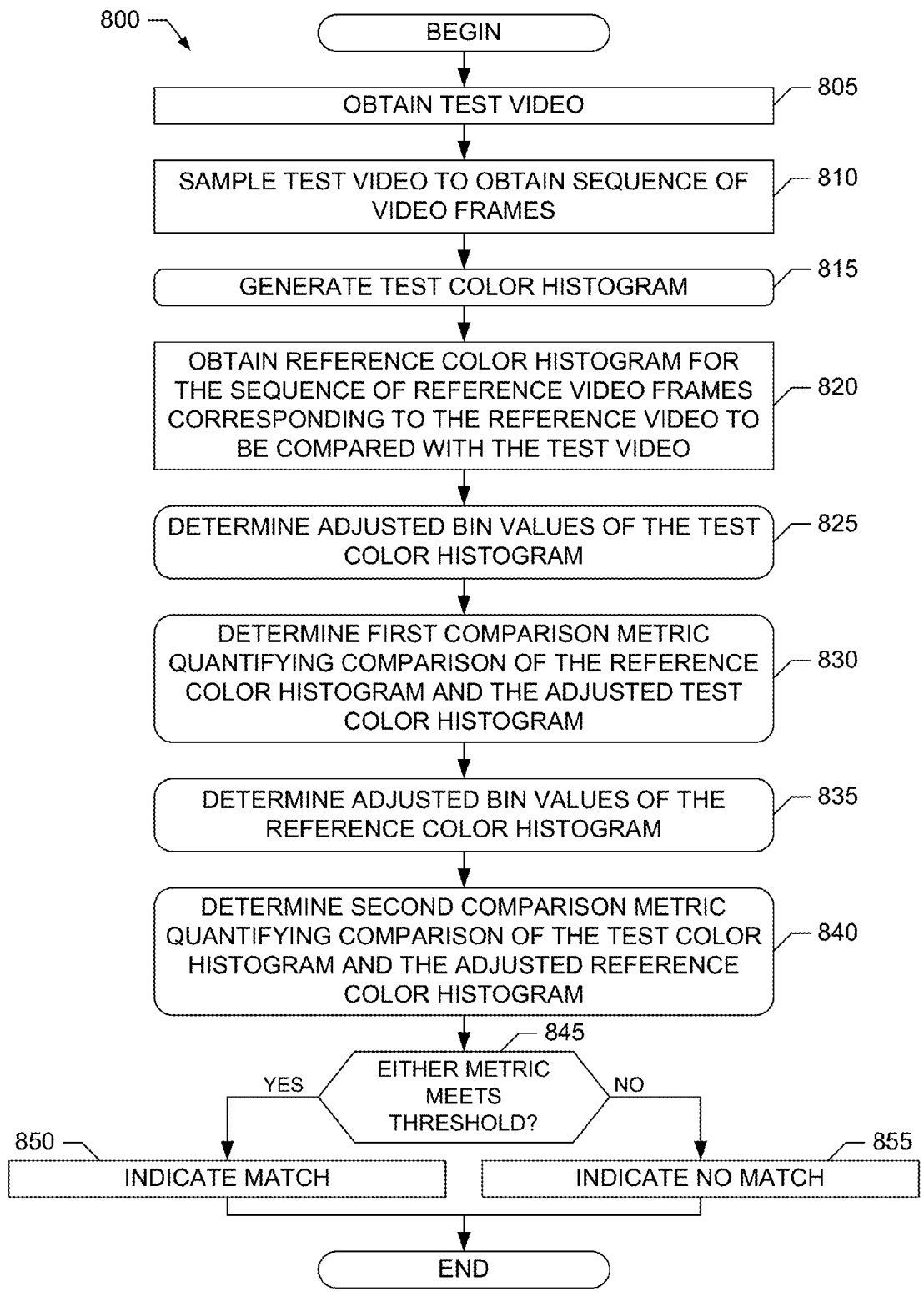
FIG. 8 is a flowchart representative of example machine readable instructions that may be executed to implement the example video comparison system of FIG. 1.
Figure 9:
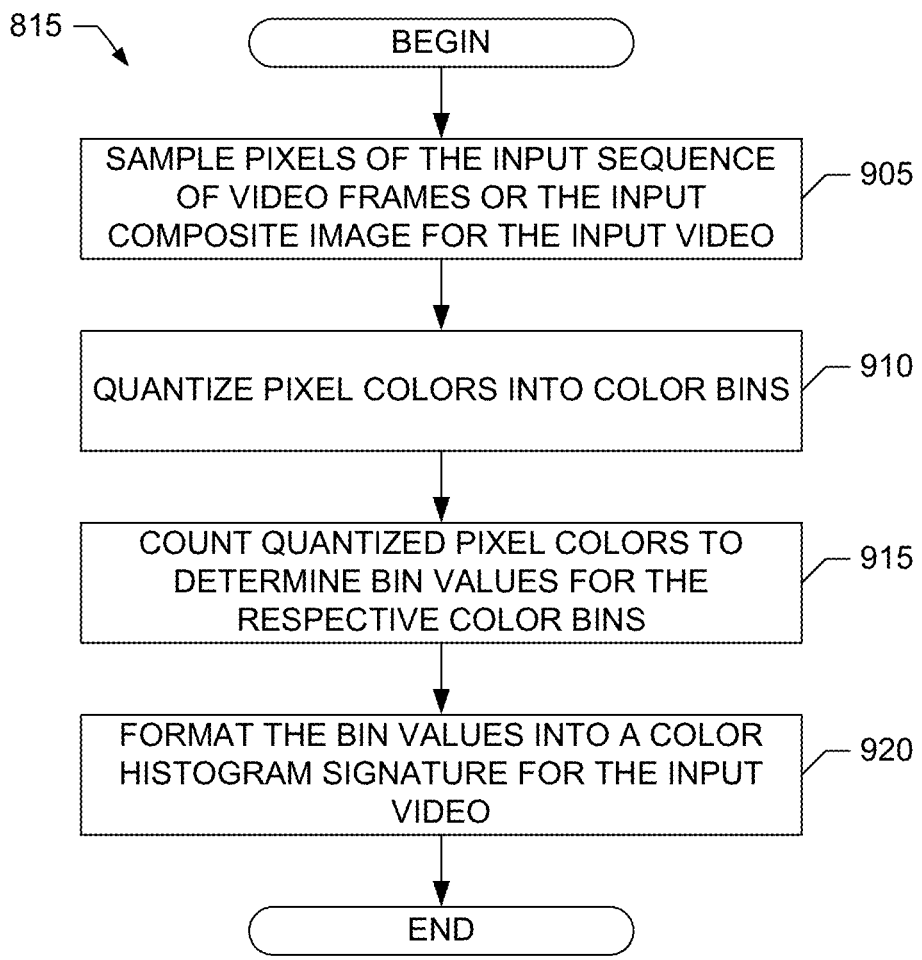
FIG. 9 is a flowchart representative of example machine readable instructions that may be executed to implement the example histogram generator of FIG. 4, and/or used to implement portions of the example machine readable instructions of FIG. 8.

Example machine readable instructions 800 that may be executed to implement the example video comparison system 100 of FIG. 1 are represented by the flowchart shown in FIG. 8. The example machine readable instructions 800 may be executed, for example, when a test video is to be compared with one or more reference videos. With reference to the preceding figures, the machine readable instructions 800 of FIG. 8 begin execution at block 805 at which the test video interface 130 of the video comparison system 100 obtains, as described above, a test (e.g., input) video for comparison with a reference video stored in the reference video library 105. At block 810, the video frame sampler 135 of the video comparison system 100 samples or otherwise obtains a sequence of test video frames (and/or sampled pixel(s)/subregion(s) of the test video frames) from the test video, as described above. At block 815, the histogram generator 145 of the video comparison system 100 determines a test color histogram, as described above, for the sequence of test video frames obtained at block 810 for the test video obtained at block 805. In some examples, at block 815 the histogram generator 145 can process the sequence of test video frames (and/or sampled pixels(s)/subregion(s) of the test video frames) individually to accumulate a test color histogram for the test video, whereas in other examples, the histogram generator 145 can process a composite test image, as described above. Example machine readable instructions that may be used to implement the processing at block 815 are illustrated in FIG. 9, which is described in greater detail below.

At block 820 the video comparison system 100 accesses the reference histogram library 125 of the video comparison system 100 to obtain a reference color histogram for a reference video in the reference video library 105 to be compared with the test video. As described above, the histogram generator 120 of the video comparison system 100 can be used to generate a reference color histogram for the reference video using processing similar to the processing (e.g., such as the processing at block 815) performed to generate the test color histogram for the test video.

Figure 10:
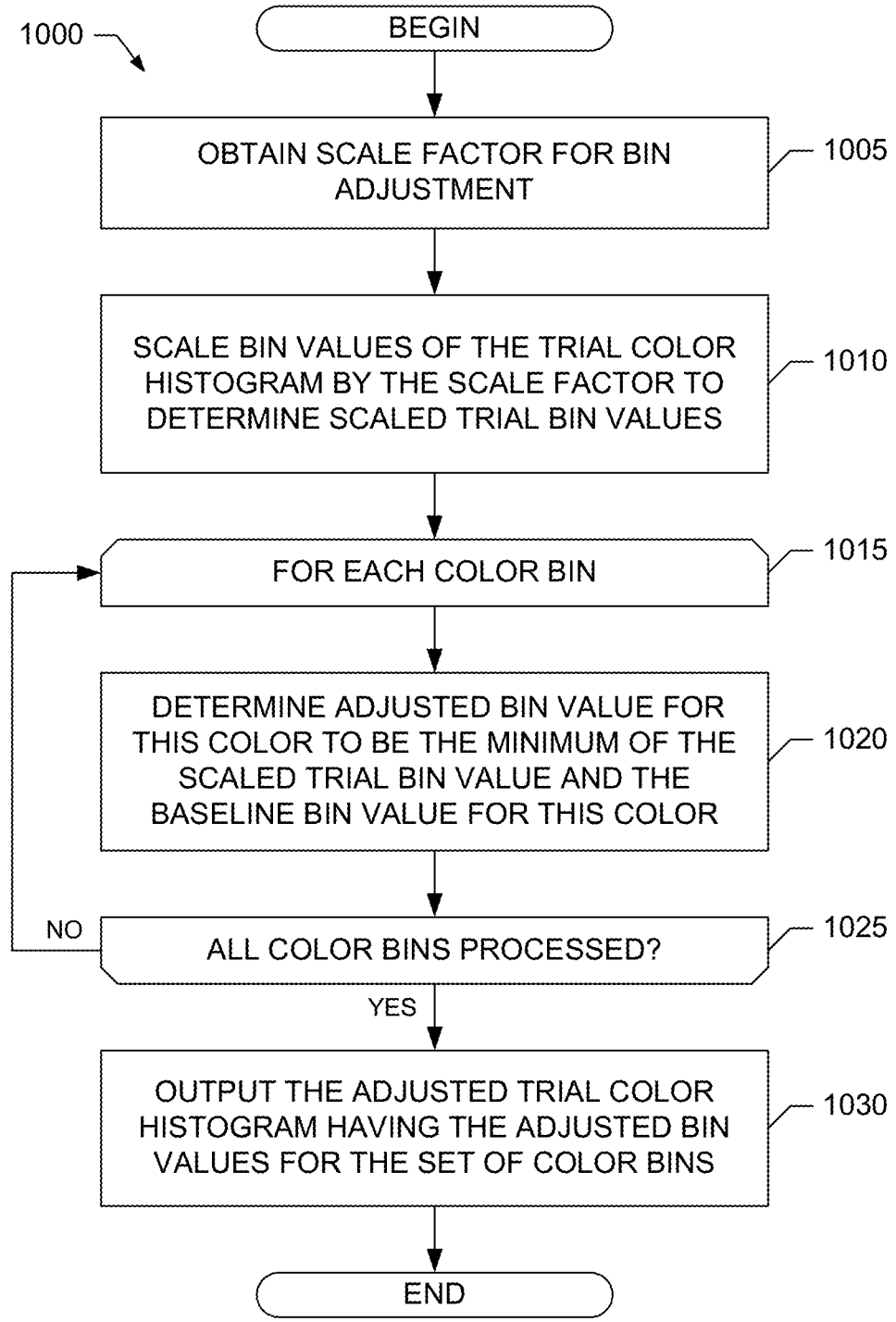
FIG. 10 is a flowchart representative of example machine readable instructions that may be executed to implement the example bin adjuster of FIG. 6 in the example histogram comparator of FIG. 5, and/or used to implement portions of the example machine readable instructions of FIG. 8.

At block 825, the histogram comparator 150 of the video comparison system 100 determines adjusted bin values of the test color histogram generated at block 815 for the test video for use in determining a first comparison metric quantifying comparison of the test video with the reference video. For example, at block 825, the bin adjuster 520 of the histogram comparator 150 uses the bin values of the reference color histogram obtained at block 820 and a scale factor, as described above, to determine the adjusted bin values of the test color histogram. Example machine readable instructions that may be used to implement the processing at block 825 are illustrated in FIG. 10, which is described in greater detail below.

Figure 11:
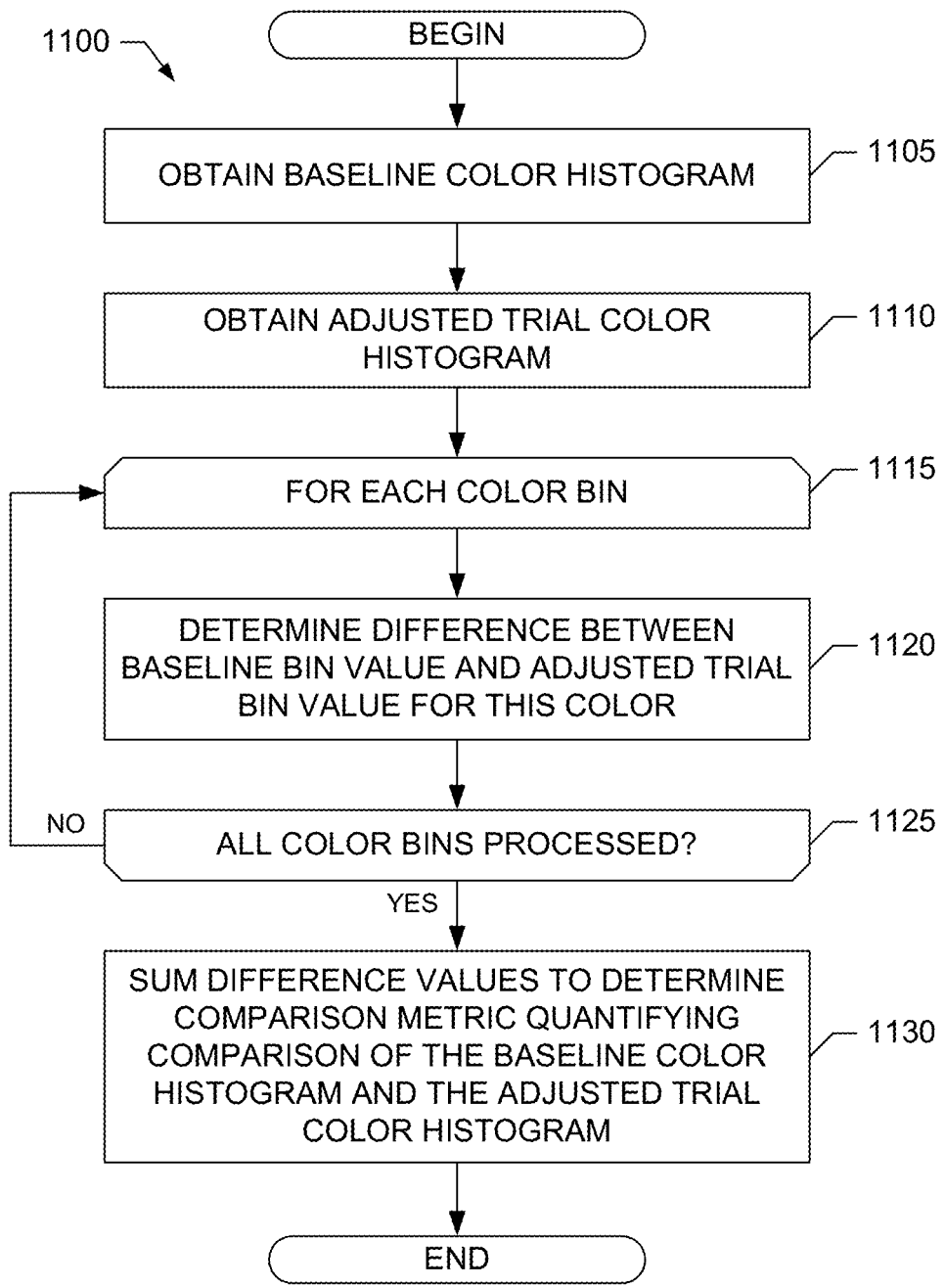
FIG. 11 is a flowchart representative of example machine readable instructions that may be executed to implement the example comparison metric determiner of FIG. 7 in the example histogram comparator of FIG. 5, and/or used to implement portions of the example machine readable instructions of FIG. 8.

At block 830, the histogram comparator 150 determines, based on the bin values of the reference color histogram obtained at block 820 and the adjusted bin values of the test color histogram determined at block 825, a first comparison metric that quantifies the results of comparing the reference video with the test video. For example, at block 830, the comparison metric determiner 525 of the histogram comparator 150 can determine the first comparison metric by summing the differences between bin values of the reference color histogram and respective adjusted bin values of the test color histogram, as described above. Example machine readable instructions that may be used to implement the processing at block 830 are illustrated in FIG. 11, which is described in greater detail below.

At block 835, the histogram comparator 150 of the video comparison system 100 determines adjusted bin values of the reference color histogram obtained at block 820 for the reference video for use in determining a second comparison metric quantifying comparison of the test video with the reference video. For example, at block 835, the bin adjuster 520 of the histogram comparator 150 uses the bin values of the test color histogram generated at block 815 for the test video and a scale factor, as described above, to determine the adjusted bin values of the reference color histogram. Example machine readable instructions that may be used to implement the processing at block 835 are illustrated in FIG. 10, which is described in greater detail below.

At block 840, the histogram comparator 150 determines, based on the bin values of the test color histogram determined at block 815 and the adjusted bin values of the reference color histogram determined at block 835, a second comparison metric that quantifies the results of comparing the reference video with the test video. For example, at block 840, the comparison metric determiner 525 of the histogram comparator 150 can determine the second comparison metric by summing the differences between bin values of the test color histogram and respective adjusted bin values of the reference color histogram, as described above. Example machine readable instructions that may be used to implement the processing at block 840 are illustrated in FIG. 11, which is described in greater detail below.

At block 845, the threshold comparator 530 of the histogram comparator 150 compares the first and second comparison metrics quantifying comparison of the test video with the reference video to a threshold, as described above. In the illustrated example, if at least one of the first comparison metric and/or the second comparison is less than or equal to the threshold (or otherwise meets the threshold) at block 845, then at block 850 the histogram comparator 150 identifies the reference video as being a match of the test video. However, if both the first and second comparison metrics are greater than the threshold (or otherwise do not meet the threshold) at block 845, then at block 855 the histogram comparator 150 indicates that the reference video does not match the test video. Execution of the example machine readable instructions 800 then ends.

Example machine readable instructions 815 that may be used to implement one or more of the histogram generators 120, 145 and/or 400, and/or to perform the processing at block 815 of FIG. 8, are illustrated in FIG. 9. For brevity, execution of the machine readable instructions 815 of FIG. 9 is described from the perspective of implementation by the histogram generator 400. However, the machine readable instructions 815 of FIG. 9 could additionally or alternatively be executed by the histogram generators 120 and/or 145.

With reference to the preceding figures, execution of the machine readable instructions 815 of FIG. 9 begins at block 905 at which the image sampler 405 of the histogram generator 400 samples, as described above, pixels of an input sequence of video frames of a video or, alternatively, a composite image formed from the sequence of video frames, to determine a set of pixels of the video for which a color histogram is to be determined. At block 910, the color quantizer 410 of the histogram generator 400 quantizes the color values (e.g., three color values, such as red, blue and green) of the sampled pixels into respective sets of color levels, as described above, to yield a total number of possible color combinations and, thus, a total number of color bins represented by the color histogram. At block 915, the color counter 415 of the histogram generator 400 counts the numbers of times each possible quantized color combination appears in the sampled set of pixels to determine the bin values of the color bins of the color histogram. At block 920, the histogram formatter 420 of the histogram generator 400 formats the bin values of the color bins into a color histogram data representation, such as a color histogram signature, for the input video, which may be stored and/or used in subsequent processing. Execution of the example machine readable instructions 815 then ends.

Example machine readable instructions 1000 that may be used to implement the bin adjuster 520 of the histogram comparator 150, and/or to perform the processing at blocks 825 and/or 835 of FIG. 8, are illustrated in FIG. 10. With reference to the preceding figures, execution of the machine readable instructions 1000 of FIG. 10 begins at block 1005 at which the bin adjuster 520 obtains the scale factor described above. At block 1010, the bin adjuster 520 scales the bin values of a trial color histogram by the scale factor obtained at block 1005 to obtain scaled bin values of the trial color histogram, as described above. For example, to determine the first comparison metric described above that quantifies comparison of the test video and the reference video, the histogram interface 505 of the histogram comparator 150 assigns the test color histogram representative of the test video to be the trial color histogram processed at block 1010. As another example, to determine the second comparison metric described above that quantifies comparison of the test video and the reference video, the histogram interface 505 assigns the reference color histogram representative of the reference video to be the trial color histogram processed at block 1010.

At block 1015, the bin adjuster 520 begins processing to adjust each bin value of the trial color histogram. For example, at block 1020, the bin adjuster 520 determines the adjusted bin value for a particular color bin to be the smaller, or minimum, of the scaled bin value for this color bin or the bin value of a baseline color histogram, as described above. For example, to determine the first comparison metric described above that quantifies comparison of the test video and the reference video, the histogram interface 505 assigns the reference color histogram representative of the reference video to be the baseline color histogram used in the processing at block 1020. As another example, to determine the second comparison metric described above that quantifies comparison of the test video and the reference video, the histogram interface 505 assigns the test color histogram representative of the test video to be the baseline color histogram used in the processing at block 1020. After the bin values of the trial color histogram have been adjusted (block 1025), at block 1030 the bin adjuster 520 outputs the adjusted bin values determined for the trial color histogram. For example, the adjusted trial color histogram output at block 1030 corresponds to the adjusted test color histogram when determining the first comparison metric described above, whereas the adjusted trial color histogram output at block 1030 corresponds to the adjusted reference color histogram when determining the second comparison metric described above. Execution of the example machine readable instructions 1000 then ends.

Example machine readable instructions 1100 that may be used to implement the comparison metric determiner 525 of the histogram comparator 150, and/or to perform the processing at blocks 830 and/or 840 of FIG. 8, are illustrated in FIG. 11. With reference to the preceding figures, execution of the machine readable instructions 1100 of FIG. 11 begins at block 1105 at which the comparison metric determiner 525 obtains a baseline color histogram for use in determining a comparison metric quantifying comparison of the reference video with the test video. For example, to determine the first comparison metric described above that quantifies comparison of the test video and the reference video, the histogram interface 505 assigns the reference color histogram representative of the reference video to be the baseline color histogram obtained at block 1105. As another example, to determine the second comparison metric described above that quantifies comparison of the test video and the reference video, the histogram interface 505 assigns the test color histogram representative of the test video to be the baseline color histogram obtained at block 1105. At block 1110, the comparison metric determiner 525 obtains the adjusted trial color histogram having adjusted bin values as determined by, for example, the bin adjuster 520, the example machine readable instructions 825, etc. For example, the adjusted trial color histogram obtained at block 1110 corresponds to the adjusted test color histogram when determining the first comparison metric described above, whereas the adjusted trial color histogram obtained at block 1110 corresponds to the adjusted reference color histogram when determining the second comparison metric described above.

At block 1115, the comparison metric determiner 525 begins determining differences between bin values of the baseline color histogram and respective adjusted bin values of the adjusted trial color histogram. For example, at block 1120, the comparison metric determiner 525 determines, for each color bin, a difference between the bin value of the baseline color histogram and the adjusted bin value of the trial color histogram for the particular color bin. After the differences for all color bins have been determined (block 1125), at block 1130 the comparison metric determiner 525 sums the difference values determined for each color bin to determine a comparison metric (e.g., the first comparison metric or the second comparison metric described above) quantifying comparison of the reference video with the test video. Execution of the example machine readable instructions 1100 then ends.

Figure 12:
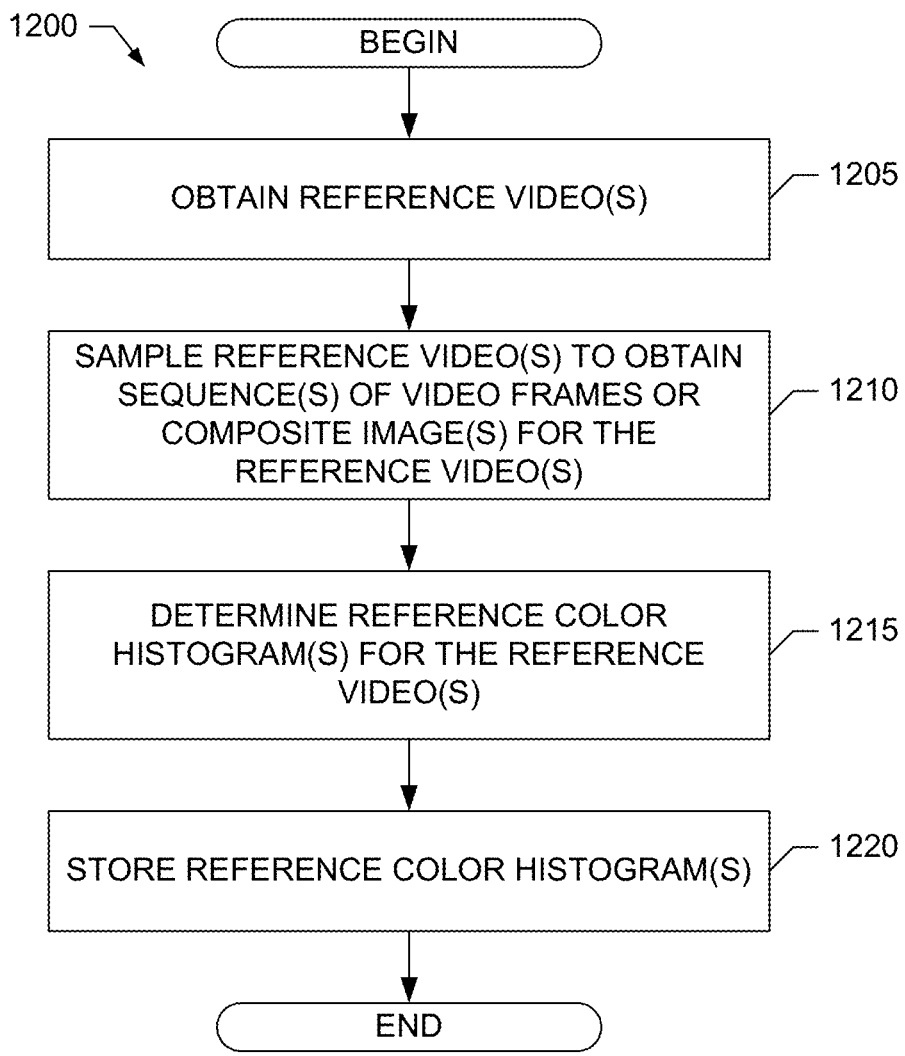
FIG. 12 is a flowchart representative of example machine readable instructions that may be executed to process a set of reference videos to determine a respective set of reference color histograms for use by the example video comparison system of FIG. 1.

Example machine readable instructions 1200 that may be executed to determine the reference color histograms stored in the reference histogram library 125 of the example video comparison system 100 and/or obtained at block 820 of example machine readable instructions 800 are represented by the flowchart shown in FIG. 12. With reference to the preceding figures, execution of the example machine readable instructions 1200 of FIG. 12 begins at block 1205 at which the video frame sampler 110 obtains the reference video(s) from the reference video library 105 for which reference color histogram(s) is(are) to be determined. At block 1210, video frame sampler 110 samples or otherwise obtains sequence(s) of video frames (and/or sampled pixel(s)/subregion(s) of the reference video frames) from the reference video(s), as described above. In some examples, the video frame sampler 110 also determines composite reference image(s) by tiling the sequence(s) of reference video frames (and/or sampled pixel(s)/subregion(s) of the reference video frames) at block 1210. At block 1215, the histogram generator 120 determines the reference color histogram(s) for the reference videos(s) using the sequence(s) of reference video frames and/or composite reference image(s) obtained at block 1210, as described above. For example, the histogram generator 120 can execute the example machine readable instructions 815 illustrated in FIG. 9 to determine the reference color histogram(s) at block 1215. At block 1220, the histogram generator 120 stores the generated reference color histogram(s) in the reference histogram library 125. Execution of the example machine readable instructions 1200 then ends.

Figure 13:
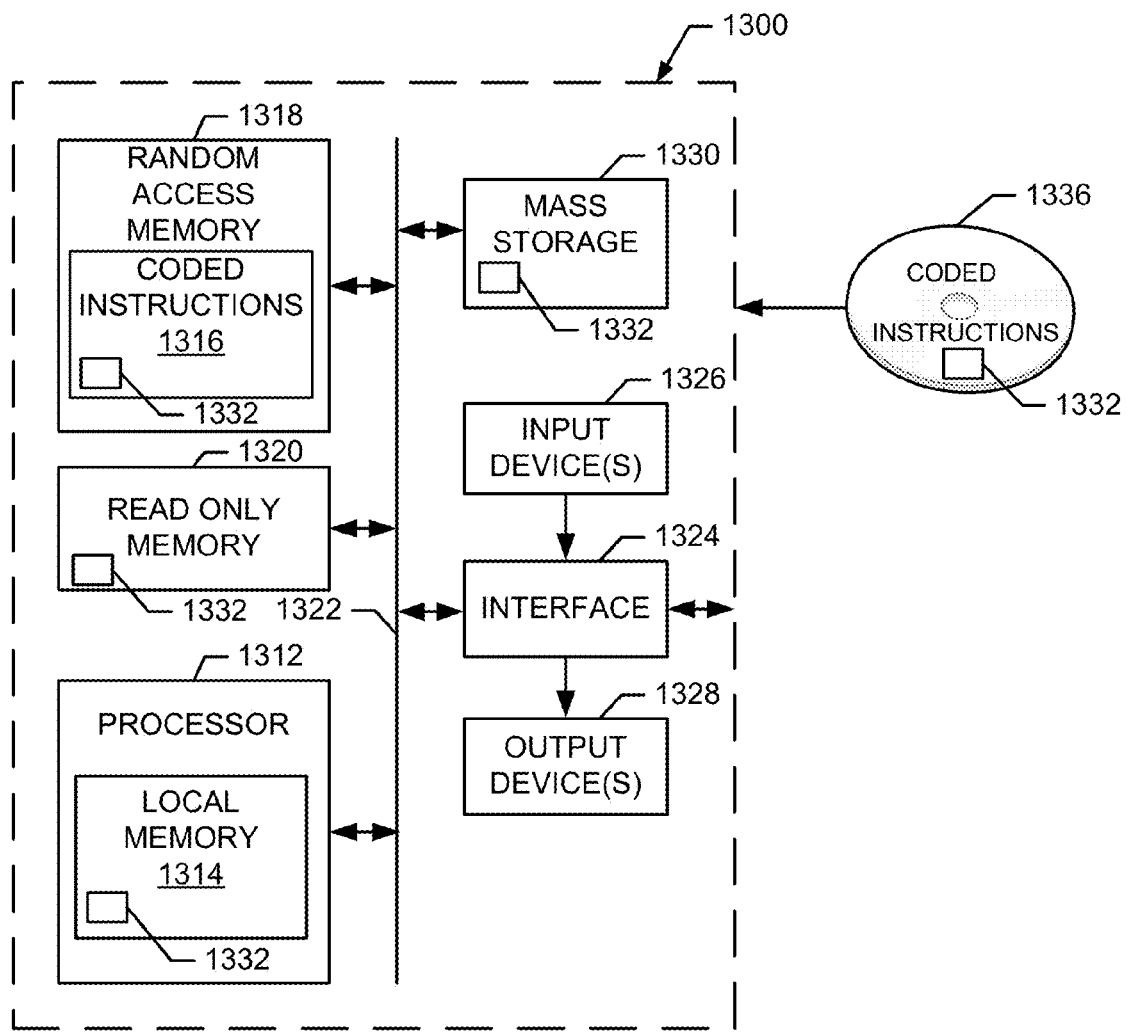
FIG. 13 is a block diagram of an example processing system that may execute the example machine readable instructions of FIGS. 8-11 and/or 12 to implement the example video comparison system of FIG. 1, the example video frame sampler of FIG. 2, the example histogram generator of FIG. 4, the example histogram comparator of FIG. 5, the example bin adjuster of FIG. 6 and/or the example comparison metric determiner of FIG. 7.

FIG. 13 is a block diagram of an example processing system 1300 capable of executing the instructions of FIGS. 8-12 to implement the example video comparison system 100, the example video frame samplers 110, 135 and/or 200, the example histogram generators 120, 145 and/or 400, the example test video interface 130, the example histogram comparator 150, the example results interface 155, the example image sampler 205, the example sampling controller 210, the example image sampler 405, the example color quantizer 410, the example color counter 415, the example histogram formatter 420, the example histogram interface 505, the example bin adjuster 520, the example comparison metric determiner 525, the example threshold comparator 530, the example bin scaler 605, the example value selector 610, the example bin difference determiner 705 and/or the example difference summer 710 of FIGS. 1-7. The processing system 1300 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1300 of the instant example includes a processor 1312. For example, the processor 1312 can be implemented by one or more microprocessors and/or controllers from any desired family or manufacturer. The processor 1312 includes a local memory 1314, and executes coded instructions 1316 present in the local memory 1314 and/or in another memory device.

The processor 1312 is in communication with a main memory including a volatile memory 1318 and a non-volatile memory 1320 via a bus 1322. The volatile memory 1318 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1320 may be implemented by flash memory and/or any other desired type of memory device. Access to the main memory, including the memories 1318 and 1320, is controlled by a memory controller.

The processing system 1300 also includes an interface circuit 1324. The interface circuit 1324 may be implemented by any type of interface standard, such as an Ethernet interface, a universal serial bus (USB), and/or a PCI express interface.

One or more input devices 1326 are connected to the interface circuit 1324. The input device(s) 1326 permit a user to enter data and commands into the processor 1312. The input device(s) can be implemented by, for example, a keyboard, a mouse, a touchscreen, a track-pad, a trackball, a trackbar (such as an isopoint), a voice recognition system, and/or any other human-machine interface.

One or more output devices 1328 are also connected to the interface circuit 1324. The output devices 1328 can be implemented, for example, by display devices (e.g., a liquid crystal display, a cathode ray tube display (CRT)), by a printer and/or by speakers. The interface circuit 1324, thus, typically includes a graphics driver card.

The interface circuit 1324 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1300 also includes one or more mass storage devices 1330 for storing machine readable instructions and data. Examples of such mass storage devices 1330 include floppy disk drives, hard drive disks, compact disk drives and digital versatile disk (DVD) drives. In some examples, the mass storage device 1330 may implement the reference video library 105, the composite reference image storage 115, the reference histogram library 125, the composite test image storage 140, the trial histogram storage 510 and/or the baseline histogram storage 515. Additionally or alternatively, in some examples the volatile memory 1318 may implement the reference video library 105, the composite reference image storage 115, the reference histogram library 125, the composite test image storage 140, the trial histogram storage 510 and/or the baseline histogram storage 515.

Coded instructions 1332 corresponding to the instructions of FIGS. 8-12 may be stored in the mass storage device 1330, in the volatile memory 1318, in the non-volatile memory 1320, in the local memory 1314 and/or on a removable storage medium, such as a CD or DVD 1336.

As an alternative to implementing the methods and/or apparatus described herein in a system such as the processing system of FIG. 13, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to compare video sequences, the method comprising:
   determining a color histogram corresponding to an input video sequence based on color values of pixels sampled from a plurality of video frames of the input video sequence;
   tiling video frames of a first reference video sequence to determine a composite image;
   determining a first reference color histogram corresponding to the first reference video sequence based on color values of pixels in the composite image;
   adjusting the color histogram corresponding to the input video sequence based on the first reference color histogram corresponding to the first reference video sequence to determine an adjusted color histogram corresponding to the input video sequence; and
   comparing the adjusted color histogram and the first reference color histogram to determine whether the first reference video sequence matches the input video sequence.

2. A method as defined in claim 1, wherein determining the color histogram corresponding to the input video sequence includes:
   sampling a set of pixels from the plurality of video frames of the input video sequence;
   determining respective color combinations for respective ones of the set of pixels, a first color combination for a first one of the set of pixels being determined by combining a first color value for the first one of the set of pixels and a second color value for a neighboring pixel of the first one of the set of pixels; and
   counting respective occurrences of different ones of the color combinations to determine the color histogram corresponding to the input video sequence.

3. A method as defined in claim 2, further including:
   capturing the input video sequence using a camera operating at a first frame rate;
   sampling the input video sequence at a second frame rate lower than the first frame rate to obtain the plurality of video frames of the input video sequence; and
   displaying a result indicating whether the first reference video sequence matches the input video sequence.

4. A method as defined in claim 1, further including:
   determining a first comparison value by comparing the adjusted color histogram and the first reference color histogram;
   adjusting the first reference color histogram based on the color histogram corresponding to the input video sequence to determine a first adjusted reference color histogram;
   determining a second comparison value by comparing the first adjusted reference color histogram and the color histogram corresponding to the input video sequence; and
   determining that the first reference video sequence matches the input video sequence when at least one of the first comparison value or the second comparison value satisfies a threshold.

5. A method as defined in claim 1, wherein adjusting the color histogram corresponding to the input video sequence based on the first reference color histogram includes:
   multiplying a value of a first bin of the color histogram corresponding to the input video sequence by a scale factor to determine a scaled bin value; and determining an adjusted value of a corresponding first bin of the adjusted color histogram to be a smaller of the scaled bin value and a value of a corresponding first bin of the reference color histogram.

6. A method as defined in claim 5, wherein the scale factor is adjustable.

7. A tangible computer readable medium comprising computer readable instructions which, when executed, cause a processor to at least:
  determine a color histogram corresponding to an input video sequence based on color values of pixels sampled from a plurality of video frames of the input video sequence;
  tile video frames of a first reference video sequence to determine a composite image;
  determine a first reference color histogram corresponding to the first reference video sequence based on color values of pixels in the composite image;
  adjust the color histogram corresponding to the input video sequence based on the first reference color histogram corresponding to the first reference video sequence to determine an adjusted color histogram corresponding to the input video sequence; and
  compare the adjusted color histogram and the first reference color histogram to determine whether the first reference video sequence matches the input video sequence.

8. A tangible computer readable medium as defined in claim 7, wherein to determine the color histogram corresponding to the input video sequence, the instructions, when executed, cause the processor to:
  sample a set of pixels from the plurality of video frames of the input video sequence;
  determine respective color combinations for respective ones of the set of pixels, a first color combination for a first one of the set of pixels being determined by combining a first color value for the first one of the set of pixels and a second color value for a neighboring pixel of the first one of the set of pixels; and
  count respective occurrences of different ones of the color combinations to determine the color histogram corresponding to the input video sequence.

9. A tangible computer readable medium as defined in claim 8, wherein the instructions, when executed, further cause the processor to:
  capture the input video sequence using a camera operating at a first frame rate;
  sample the input video sequence at a second frame rate lower than the first frame rate to obtain the plurality of video frames of the input video sequence; and
  display a result indicating whether the first reference video sequence matches the input video sequence.

10. A tangible computer readable medium as defined in claim 7, wherein the instructions, when executed, further cause the processor to:
  determine a first comparison value by comparing the adjusted color histogram and the first reference color histogram;
  adjust the first reference color histogram based on the color histogram corresponding to the input video sequence to determine a first adjusted reference color histogram;
  determine a second comparison value by comparing the first adjusted reference color histogram and the color histogram corresponding to the input video sequence; and
  determine that the first reference video sequence matches the input video sequence when at least one of the first comparison value or the second comparison value satisfies a threshold.

11. A tangible computer readable medium as defined in claim 7, wherein to adjust the color histogram corresponding to the input video sequence based on the first reference color histogram, the instructions, when executed, further cause the processor to:
  multiply a value of a first bin of the color histogram corresponding to the input video sequence by a scale factor to determine a scaled bin value; and
  determine an adjusted value of a corresponding first bin of the adjusted color histogram to be a smaller of the scaled bin value and a value of a corresponding first bin of the reference color histogram.

12. A tangible computer readable medium as defined in claim 11, wherein the scale factor is adjustable.

13. An apparatus to compare video sequences, the apparatus comprising:
  a histogram generator to determine a color histogram corresponding to an input video sequence based on color values of pixels sampled from a plurality of video frames of the input video sequence; and
  a histogram comparator to:
    adjust the color histogram corresponding to the input video sequence based on a first reference color histogram corresponding to a first reference video sequence to determine an adjusted color histogram corresponding to the input video sequence; and
    compare the adjusted color histogram and the first reference color histogram to determine whether the first reference video sequence matches the input video sequence;
  wherein the histogram comparator includes a bin adjuster to:
    multiply a value of a first bin of the color histogram corresponding to the input video sequence by a scale factor to determine a scaled bin value; and
    determine an adjusted value of a corresponding first bin of the adjusted color histogram to be a smaller of the scaled bin value and a value of a corresponding first bin of the reference color histogram.

14. An apparatus as defined in claim 13, wherein the a histogram generator includes:
  an image sampler to sample a set of pixels from the plurality of video frames of the input video sequence;
  a color quantizer to determine respective color combinations for respective ones of the set of pixels, a first color combination for a first one of the set of pixels being determined by combining a first color value for the first one of the set of pixels and a second color value for a neighboring pixel of the first one of the set of pixels; and
  a color counter to count respective occurrences of different ones of the color combinations to determine the color histogram corresponding to the input video sequence.

15. An apparatus as defined in claim 14, further including:
  a video interface to capture the input video sequence using a camera operating at a first frame rate;
  a video frame sampler to sample the input video sequence at a second frame rate lower than the first frame rate to obtain the plurality of video frames of the input video sequence; and
  a results interface to display a result indicating whether the first reference video sequence matches the input video sequence.

16. An apparatus as defined in claim 13, wherein the histogram comparator includes:
 a bin adjuster to:
  determine the adjusted color histogram; and
  adjust the first reference color histogram based on the color histogram corresponding to the input video sequence to determine a first adjusted reference color histogram;
 a comparison metric determiner to:
  determine a first comparison value by comparing the adjusted color histogram and the first reference color histogram; and
  determine a second comparison value by comparing the first adjusted reference color histogram and the color histogram corresponding to the input video sequence; and
 a threshold comparator to determine that the first reference video sequence matches the input video sequence when at least one of the first comparison value or the second comparison value satisfies a threshold.

17. An apparatus as defined in claim 13, wherein the scale factor is adjustable.

\* \* \* \* \*